(12) United States Patent
Horst

(10) Patent No.: US 10,350,780 B2
(45) Date of Patent: Jul. 16, 2019

(54) INDIVIDUAL TRANSPORT OF FOOD PORTIONS

(71) Applicant: WEBER MASCHINENBAU GMBH BREIDENBACH, Breidenbach (DE)

(72) Inventor: Theodor Horst, Amoneburg (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 0 days.

(21) Appl. No.: 15/524,371

(22) PCT Filed: Oct. 6, 2015

(86) PCT No.: PCT/EP2015/073002
§ 371 (c)(1),
(2) Date: May 4, 2017

(87) PCT Pub. No.: WO2016/071062
PCT Pub. Date: May 12, 2016

(65) Prior Publication Data
US 2018/0169887 A1    Jun. 21, 2018

(30) Foreign Application Priority Data
Nov. 7, 2014  (DE) .................. 10 2014 116 233

(51) Int. Cl.
*B65G 17/48*    (2006.01)
*B65G 43/08*    (2006.01)
(Continued)

(52) U.S. Cl.
CPC .............. *B26D 7/32* (2013.01); *B26D 5/00* (2013.01); *B60L 13/04* (2013.01); *B65B 25/06* (2013.01);
(Continued)

(58) Field of Classification Search
None
See application file for complete search history.

(56) References Cited

U.S. PATENT DOCUMENTS 3,615,001 A * 10/1971 Temple .................. B65B 35/50
198/363
3,708,055 A * 1/1973 Miller .................. B65G 47/681
198/357

(Continued)

FOREIGN PATENT DOCUMENTS

CH        542093 A      9/1973
DE        3231901 A1    3/1984
(Continued)

OTHER PUBLICATIONS all-electronics.de, Motion Control, "Auf die Schiene gesetzt", Mar. 27, 2013, pp. 1-3, http://www.all-electronics.de/texte/anzeigen/49979/Auf-die-Schiene-gesetzt.

(Continued)

*Primary Examiner* — Kavel Singh
(74) *Attorney, Agent, or Firm* — Wiggin and Dana LLP; Gregory S. Rosenblatt

(57) ABSTRACT

The invention relates to a system comprising at least one slicing apparatus, in particular a high-performance slicer, for slicing food products; a conveying apparatus for moving portions that each comprise at least one slice cut off from a food product; and at least one packaging apparatus for packaging the portions, wherein the conveying apparatus comprises a plurality of individually movable transport movers for the transport of portions; a path system for the transport movers in which the transport movers are movable along at least a predefined path in a direction of transport; and a control device for controlling the movements of the transport movers in the path system; wherein the transport movers each comprise at least one rotor cooperating with the (Continued)

Figure 1:
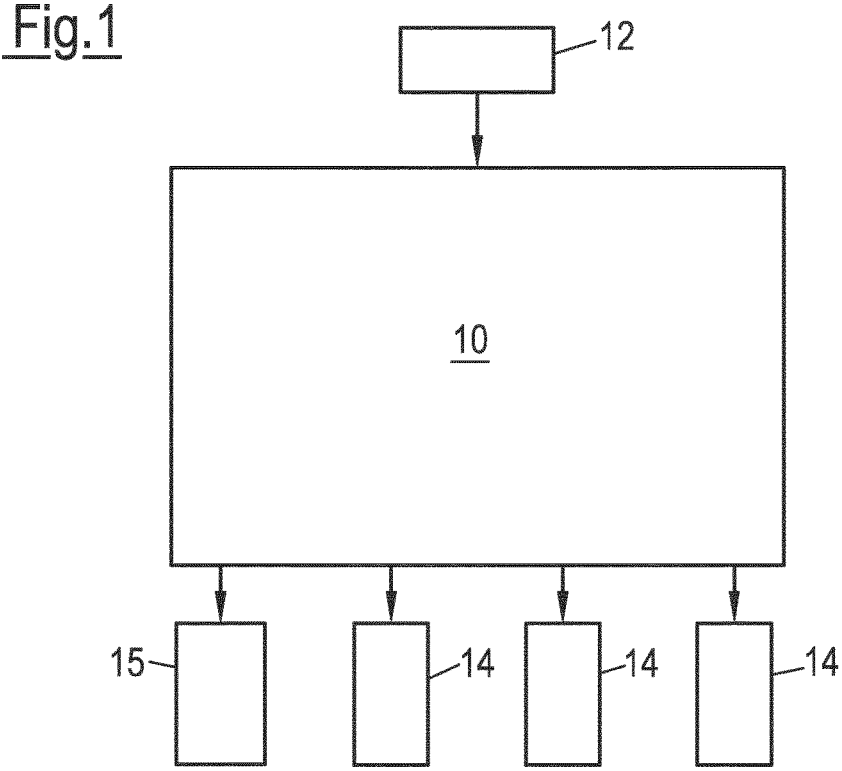

path system and at least one carrier for portions attached to the rotor; and wherein the conveying apparatus is configured for moving the portions from the slicing apparatus to the packaging apparatus.

26 Claims, 13 Drawing Sheets

(51) Int. Cl.

| | | |
|---|---|---|
| B26D 7/32 | (2006.01) | |
| B26D 5/00 | (2006.01) | |
| B60L 13/04 | (2006.01) | |
| B65B 25/06 | (2006.01) | |
| B65B 35/10 | (2006.01) | |
| B65G 47/90 | (2006.01) | |
| B65G 54/02 | (2006.01) | |

(52) U.S. Cl.
CPC ............ *B65B 35/10* (2013.01); *B65G 47/90* (2013.01); *B65G 54/02* (2013.01); *B26D 2210/02* (2013.01); *B65G 2201/0202* (2013.01)

(56) References Cited

U.S. PATENT DOCUMENTS

| | | | |
|---|---|---|---|
| 5,391,386 A * | 2/1995 | Mally | B26D 7/32 198/428 |
| 6,938,750 B2 * | 9/2005 | Miller | B65G 17/345 198/370.04 |
| 7,735,626 B2 * | 6/2010 | Cope | G01N 1/28 111/178 |
| 8,910,457 B2 * | 12/2014 | Lagares Corominas | B26D 7/32 198/431 |
| 2012/0291602 A1 | 11/2012 | Eckhardt et al. | |

FOREIGN PATENT DOCUMENTS

| | | |
|---|---|---|
| DE | 3711688 A1 | 10/1988 |
| DE | 102006007496 A1 | 8/2007 |
| DE | 102011017101 A1 | 10/2012 |
| DE | 102012005598 A1 | 9/2013 |
| WO | 2003/029651 A1 | 4/2003 |
| WO | 2010/085670 A1 | 7/2010 |
| WO | 2015/162182 A1 | 10/2015 |

OTHER PUBLICATIONS

Beckoff: New Automation Technology, "Maximum efficiency and flexibility: PC-based control for the packaging industry", May 5, 2014, pp. 4, 5, 8 and 12, http.//download.beckhoff.com/download/Document/catalog/Beckhoff_Verpackungsindustrie.pdf.

* cited by examiner

INDIVIDUAL TRANSPORT OF FOOD PORTIONS

The invention relates to the moving of portions which each comprise at least one slice cut off from a food product, in particular by means of a slicing apparatus, in particular by means of a high-speed slicer.

Conveyor systems are in particular required in the production of single-sort or multi-sort packs which include one or more portions of, for example, slices of sausage and/or cheese to supply the slices of food produced by means of one or more slicing apparatus, in particular so-called slicers, and forming portions or at least part portions to a packaging machine.

The conveyor line serves in practice not only for the transport of the portions from the slicer to the packaging apparatus, but rather has to satisfy additional functions which are dependent on the respective application, which are generally familiar to the skilled person and of which only buffering and format formation, in accordance with the demands of a packaging apparatus, should be named by way of example at this point. In addition, portioning work and completion work have to be satisfied directly subsequent to the slicer. The portions must furthermore be weighed.

A so-called multi-track operation in which a plurality of food products are sliced simultaneously by means of a slicer is additionally becoming more and more important. The downstream conveyor system has to be capable of such a multi-track operation and must above all be able to form those formats, also called format sets, from the portions produced in the respective number of tracks which can be conveyed or processed by the packaging apparatus arranged downstream.

This object and further objects of a conveyor system in the field of handling portions of slices cut off from food products, in particular food products of loaf or bar shape, by means of slicers are currently satisfactorily achieved using conveyor belt systems. Conveyor belt systems are, however, associated with a high mechanical effort. In addition, the transitions between consecutive conveyor belt sections are e.g. in particular problematic with respect to the required gentle transport of the portions. Furthermore, only straight conveyor lines or conveyor lines comprising straight-line sections can naturally be implemented with conveyor belts, i.e. the flexibility in the design of a conveyor line is limited in conveyor belt systems. The possibilities of the total system are equally limited, e.g. with respect to the products to be processed and the formation possibilities of the portions and formats. In addition, a comparatively high effort is required in the cleaning in association with the conveyor belt systems used in the food sector to be able to observe the high hygiene standards.

Against this background, it is an object of the invention to provide a possibility for the transport of food portions in which the above-mentioned restrictions do not exist and which can nevertheless satisfy the demands currently made with a flexibility which is as high as possible.

This object is satisfied by the features of claim 1. The system in accordance with the invention comprises at least one slicing apparatus, in particular a high-speed slicer, for slicing food products; a conveying apparatus for moving portions that respectively comprise at least one slice cut off from a food product; and at least one packaging apparatus for packaging the portions. The conveying apparatus has a plurality of individually movable transport movers for the transport of portions, a path system or conveyor system for the transport movers in which the transport movers are movable along at least one predefined path in a direction of transport, and a control device for controlling or regulating the movement of the transport movers in the path system or conveyor system. The control device can also in particular distribute and/or associate the transport movers. The transport movers respectively comprise at least one rotor cooperating with the path system or conveyor system and at least one carrier for portions attached to the rotor, e.g. by means of a holder. The conveying apparatus is configured for moving the portions from one or more slicing apparatus to one or more packaging apparatus.

The term "portion" is to be understood as broad within the framework of the invention. A portion can accordingly consist of only one single slice. Alternatively, a portion can comprise a plurality of slices which can be present in a relative arrangement of generally any form, for example in a so-called stacked or overlapping arrangement such as is familiar to the skilled person in the technical field in question here. The portion can be a total portion such as is subsequently packaged and offered for sale on the market. Alternatively, the portion can be a part portion which only forms a total portion together with one or more further part portions which can in turn each comprise one or more slices. The part portions of a total portion can be formed from different product sorts so that a multi-sort portion can be produced by assembling a plurality of part portions and so that a multi-sort pack is thus present after its packaging. The slices can, for example, be comparatively thin slices such as are generally known in the form of assorted slices of sausage or of cheese. Alternatively, the slices can each be pieces that are relatively thick in comparison with assorted slices such as pieces of fresh meat.

In other words, a portion within the framework of the invention is the unit which is the smallest with respect to the transport task, which has to be transported over a specific line, on the one hand, and which optionally—depending on the application—additionally has to be put into relation with further portions, on the other hand, to satisfy the respective demands of the total system which comprises one or more slicing apparatus, in particular slicers, the path system, and one or more packaging apparatus, for example with respect to the formation of formats such as have to be provided for the respective provided packaging machine.

A transport mover can transport one or more portions. It is alternatively also possible that a plurality of transport movers, in particular two transport movers, transport a portion together. The transport movers can in this respect so-to-say be moved together as a unit on the path system. In this manner, larger loads, in particular heavier portions and/or portions larger in area, can also be moved on the path system than with only one transport mover.

The number of the transport movers or carriers located and required on the path system is variable and dependent on operation. The regulation of the required transport movers and/or of the coupling of transport movers can take place in dependence on the application or on the cutting program. The number of transport movers can be determined, displayed and/or preselected in an automated manner in this respect. This regulation can in particular relate to the total plant or also only to part sections of the path system. The regulation can preferably take place in cooperation with the travel speeds of the movers and/or with the position or availability of holding tracks, e.g. for parking, cleaning and/or converting.

At least one carrier, and in particular every carrier, is preferably configured for directly receiving at least one portion and e.g. comprises a support surface for the portion which is at least substantially planar. The carrier can also comprise a conveyor belt whose upper side forms the support surface.

It is hereby not necessary to provide the transport movers with parts of the final packaging, for example a lower packaging part also called a tray, since the portion can be received directly from the transport mover or its carrier itself. This has the advantage, for example, that the transfer of a portion to the packaging can be transferred at a region directly optimized for this purpose and in a manner directly optimized for this purpose, for example with the aid of a conveyor belt of the carrier. It is in particular not necessary to move parts of a packaging in the path system. It is, for example, not necessary to collect the individual part portions after one another on the production of multi-sort packs by moving around a packaging component such as a so-called tray.

Provision can furthermore be made in accordance with the invention that at least one carrier, and preferably every carrier, is configured to remain at the transport mover in operation or for an only temporary separation from the transport mover and a subsequent reuse or recycling at the transport mover or at another transport mover. The carriers from which the portions are received are therefore in this respect also a component of the transport system on a possibly temporary separation from the respective transport mover and are consequently not external components such as parts of a packaging.

The use in accordance with the invention of a path system having one or more paths for the transport movers does not necessarily mean that the transport movers are only movable in one dimension such as individual cars of a roller coaster. A path in the sense of the invention is in particular also to be understood as a line on which the transport movers are movable transversely to the direction of transport and can, for example, also change to a parallel track.

Irrespective of this possible configuration of the invention, provision is made in accordance with a preferred further development that the transport movers are movable at least sectionally only in one dimension in the path system.

Provision is in particular made in this respect that the transport movers are compulsorily guided by the path system.

A guide for the transport movers can, for example, comprise a rail system, in particular a pair of rails, which comprises rails which run in parallel with one another and by which or between which the transport mover is guided.

The transport mover can slide or roll on a guide, for example.

A guide of the transport mover can also take place over its rotors. For this purpose, the rotor can have slits or grooves which can be in engagement with one or more rails of a guide rail system. It is, however, not compulsory that such guide means of the transport movers are provided at their rotors. A guide of the transport mover can take place fully independently of the rotor. The rotor can in particular only serve for a drive of the transport conveyor.

Provision is preferably made that the transport movers are arranged in the path system secure against falling out. This can in particular take place by engaging behind, engaging beneath and/or engaging around a guide, in particular by means of the rotor.

Such an arrangement secure against falling out is in particular of advantage when the path system comprises such path sections in which the transport movers or their rotors are arranged at the side or at the bottom.

Provision is made in an embodiment that the path system for the transport movers comprises a drive section and a guide connected to the drive section. The functions "drive", on the one hand, and "guide", on the other hand, in the path system can hereby at least be separated from one another for some path sections and in particular for all path sections.

The drive section can in particular be configured as a stator of a linear motor which cooperates with the rotors of the transport movers. Such a drive principle, which represents one of a plurality of drive principles possible within the framework of the invention, will be looked at in more detail in the following.

As regards the drive of the transport movers in the path system, the transport movers can each be designed as self-propelling or as self-running in accordance with a possible aspect of the invention. For this purpose, for example, each transport mover can take along its own drive unit which, for example, comprises one or more electric motors. The drive unit can, for example, drive one or more balls, rolls, rollers or wheels by means of which the transport movers can each travel autonomously in the path system.

An energy supply of the drive units can take place via the path system, for example. Electrical energy can hereby be supplied to the transport movers permanently, for example. Alternatively or additionally, each transport mover can comprise a rechargeable battery. The charging can take place, e.g. inductively, at one or more specific path sections, for example with a stationary transport mover. Alternatively or additionally, the charging can take place, inductively for example, during the transport principle with a moving transport mover.

Provision can be made alternatively to a self-propelling drive or a self-running drive of the transport movers that the drive for the transport movers is respectively formed by the rotor and by the path system, with the respective rotor and the path system in particular together forming an electromagnetic drive for the transport mover.

The drive for the transport movers can respectively be formed as a linear motor, in particular as a linear synchronous motor or as a linear induction motor.

Such linear motors are generally known in connection with a plurality of applications. Such a drive principle is inter alia advantageous when comparatively small loads are to be transported such as is the case in the sector of the transport of food products in question here.

A transport system which can generally be used for the invention and to which reference will explicitly made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the rotor of the linear motor carries the permanent magnets and the stator of the linear motor produces the electromagnetic traveling field, the drive principle of an LSM drive can be figuratively imagined such that the transporter provided with the permanent magnet is pulled over the transport line by the magnetic field moving along the stator. Such a transport system or drive principle is described, for example, in WO 2003/029651 A2 and WO 2010/085670 A1. Reference is herewith explicitly made to this document with respect to the disclosure of a possible drive principle or function principle for the invention.

The path system or the individual paths of such a transport system can be divided into a plurality of consecutive path elements which so-to-say each form a single linear motor and can be individually controlled by a control device. If the transport movers located in the path system can be identified simultaneously by means of the control device, generally any desired number of transport movers can in this manner then be operated simultaneously in a path system of generally any desired complexity and can be individual moved in this respect.

The above-mentioned company MagneMotion, Inc. uses a technique for the identification and localization of the individual transporters in the path system in which each transporter is provided with a transducer which induces a signal in the stator formed by the path system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between transporters following one another. A transporter can thus only travel into the next path element when it is allowed by the control device, which is in particular not the case when another transporter is in the path element.

Against the background of this generally known transport system, provision is made in a possible embodiment in the invention that the path system is configured as a stator of the linear motor.

The rotor is in particular a respective component of a linear synchronous motor, with the rotor in particular comprising at least one permanent magnet and the path system being configured as a motor stator.

The path system is in particular divided into a plurality of path elements which in particular each represent a single linear motor and which are individually controllable by the control device.

The transport movers are preferably identifiable by the control device.

The transport movers can furthermore preferably be localized in the path system by the control device.

It has been recognized in accordance with the invention that with an individual system having individually movable transporters for the portions, all the demands on a transport system for food portions currently made and also conceivable in the future can be mapped in an ideal manner. Whereas the prior art is attached to the idea of having to effect the transport of food portions by means of conveyor belt systems, the invention signifies a turning away from such a joint transport toward "individual transportation" in which the portions can be moved independently of one another—within the framework predefined by the path system—and can in particular also be individually registered in the overall system.

In accordance with the invention, the transport system comprises a plurality of transport movers whose total number depends on the respective application. It is an aspect of the invention not to move just some few portions and not to provide only a relative small number of e.g. fewer than 10 transport movers for this purpose. Provision is rather in particular made in accordance with the invention that the path system comprises several dozen up to some hundred transport movers, i.e. a positive "cluster" of transport movers can so-to-say be present in the path system to transport a plurality of portions and optionally to carry out additional functions such as a buffering, a distribution and/or an association of portions.

A substantial advantage of the transport system in accordance with the invention with respect to conventional conveyor belt systems comprises the path system for the movers not requiring any movable parts and therefore being comparatively insensitive with respect to contamination and/or being easy to clean. The path system can in particular be manufactured in a protected or encapsulated manner such that high hygienic standards can be satisfied and strict standards observed even under conditions which are extremely demanding under hygienic aspects such as in the processing of food products and the cleaning demands associated therewith. It is in particular possible in accordance with the invention to implement an IP69K capable transport system at an acceptable cost.

The transport principle in accordance with the invention can be implemented in a specific technical manner in different manners and can be designed with respect to the respective specific demands.

In accordance with the invention, portions can thus be conveyed through the sorting and/or buffering region without a portion transfer being required. In contrast to this, previous systems have a large number of transitions between the individual belts, whereby the portion quality is negatively influenced. The portion transfers are avoided or at least minimized in accordance with the invention.

Conventional systems also require a plurality of light barriers that check the position of the portions over and over again. A corresponding sensor system that determines the position of the portions on the transport line can be saved in accordance with the invention.

In accordance with the invention, a highly flexible conveying system is produced having a plurality of transport movers that can be moved individually in all directions on the path system. The portions located thereon can be parked, sorted, completed and/or oriented at any desired sites. In accordance with the invention, a slicing apparatus or also a plurality of slicing apparatus can be provided. Slices, part portions or portions can be generated therewith. The portions can be transported via the path system and the transport movers, optionally via an apparatus for completing the portions and/or via a buffer, to a packaging apparatus or to a plurality of packaging apparatus that can be of any desired design. The cycling of the transport movers in the path system can in particular be individual. The individual transport movers can thus carry a corresponding data set or a corresponding identifier that can e.g. also be associated with the transported portion, whereby they are identifiable at all times. A path control or a movement control can take place using the identification; the intervals between the transport movers, the order, the priority, the route and/or the speed of the transport movers can in particular be set.

In contrast to conventional conveyor belts, the conveying routes can also cross. A dynamic switchover or a variable, individual control or influencing of individual portions on the total conveying line can furthermore take place. Individual transport movers, and thus also portions, can thus be channeled through faster. Subsets can furthermore be branched off from a main flow. The speeds and/or the paths of the individual transport movers can also be individually adapted at any time. A flexible individual portion control can thus be ensured.

The invention also relates to a method of moving portions that respectively comprise at least one slice cut off from a food product by means of at least one slicing apparatus, in particular a high-speed slicer, in which the portions are moved by means of a plurality of individually movable transport movers that are moved by means of a control device in a path system along at least one predefined path to at least one packaging apparatus and are packaged there. The transport movers each comprise at least one rotor cooperating with the path system and at least one carrier for portions attached to the rotor.

The apparatus in accordance with the invention is in particular configured for carrying out a method of the kind described here. The method in accordance with the invention is in particular carried out using an apparatus of the kind described here.

Possible further developments of the invention are also set forth in the following part of the description, in the description of the Figures, in the drawing and in the claims.

In accordance with an embodiment, exactly one slicing apparatus and a plurality of packaging apparatus are provided. The performance of the slicing apparatus can be utilized in the best possible manner in this respect. A plurality of packaging apparatus, preferably up to five packaging apparatus, that are in particular arranged in parallel with one another can be supplied with portions by a single slicing apparatus. In conventional systems having a plurality of slicing apparatus, the slicing apparatus can, for example, be operated in part only with a substantially reduced performance since they have to be adapted to the cycle of a packaging apparatus. If only a single packaging apparatus is provided in which there is a disturbance, a stoppage can in particular occur in slicing operation. Permitted dwell times of the products can be exceeded in this respect, which is disadvantageous with respect to hygiene due to the heating of the food products.

In accordance with the invention, multi-sort portions, that will also be called mixed portions in the following, can even be produced in a system having a single slicing apparatus. The term "multi-sort portion" includes both a portion of different products, that is e.g. of different sorts of salami, and a portion having a specific placement shape or part-portion shape in which the part portions can be combined together in a so-called multi-sort pack. To be able to generate multi-sort portions with a single slicing apparatus, buffers are in particular provided which will be looked at in more detail in the following.

In accordance with a further embodiment, the maximum performance of the slicing apparatus is greater than the performance of a packaging apparatus, with the performance corresponding to the number of portions that can be generated or packaged per unit of time. With exactly one slicing apparatus or with a system in which fewer slicing apparatus than packaging apparatus are present, the maximum performance of the slicing apparatus can in particular be better utilized. The slicing apparatus can accordingly in particular run at full power and supply a plurality of packaging portions of less performance with portions.

If, in contrast, more slicing apparatus than packaging apparatus are present, the performance of a slicing apparatus can in particular be smaller than the performance of a packaging apparatus.

In accordance with a further embodiment, a plurality of slicing apparatus and a plurality of packaging apparatus are provided. They can be flexibly connected to one another by the path system. It is also possible to integrate or to bypass individual slicing apparatus or packaging apparatus. This can in particular take place in dependence on the product, portion, format, operation and/or performance.

A change between the packaging apparatus is in particular possible in a flexible manner. In particular the cleaning, the setup and/or the setting are thereby facilitated. An ideal utilization of the respective packaging apparatus and a fast change between individual packaging apparatus can in particular be made possible. This is in particular advantageous when, for example, product sorts of the same type are packaged in different packaging. A specific deep-draw shape or deep-draw film can in this respect remain respectively set up on a packaging machine.

In accordance with a further embodiment, at least two packaging apparatus differ from one another and are in particular configured as deep-draw packagers or tray packagers. The packaging apparatus can thus be of different types and can, for example, be arranged in parallel with one another.

A change between a tray packager and a deep-draw packager can in particular be advantageous to avoid standstills of the slicing apparatus and to utilize the performance of the slicing apparatus in the best possible manner. There can in particular be the possibility by a parallel arrangement of at least one deep-draw packager and at least one tray packager of moving off overcapacities of portions at the output side of the plant into a tray packager. This can in particular also be helpful for bridging on conversion breaks at other packaging apparatus. The system in accordance with the invention makes it possible in an efficient manner to supply a plurality of packaging apparatus with portions in an alternating and flexible manner. This is in particular made possible by a fast switchover and by a spatial traveling of the portions. Transversely extending path sections can in this respect preferably be provided that are caused by the positioning of the packaging apparatus. An alternating supply of different packaging apparatus can be implemented in an economic manner by the system in accordance with the invention, in particular together with a corresponding control capable of position determination.

In accordance with a further embodiment, the path system for each packaging apparatus comprises a buffer for receiving at least one transport mover or carrier, wherein in particular the buffer comprises at least one path section or a plurality of path sections of the path system. Portions that are in particular buffered in the buffers can thus be used for generating multi-sort portions.

A buffering of portions is in particular also of advantage in the field of slicing food products in question here when—as is frequently the case in practice—more portions are produced per time unit by means of one or more slicing apparatus than are led off at the end of the system, in particular by means of one or more packaging apparatus.

To generate multi-sort portions, the outflow demand of portions that are conveyed by the path system to the packaging apparatus can be detected and taken into account at the input side and for the correspondingly adapted slicing operation such that the outflow coincides with the formation of multi-sort portions. The supply quantity of products to the slicing apparatus is thus controlled and the portions are moved to a buffer. The access to the buffer and a corresponding combination of the buffer content subsequently take place, i.e. a multi-sort package can be formed from a portion stock in the buffer. Transport movers having portions or part portions of different sorts can thus be brought into a desired order. This is in particular possible in that the control knows the product data and the current position of the individual transport movers and controls the transport movers accordingly. They can then arrive at the output side of the path system ready for transfer and in the correct order.

Alternatively, the path system comprises a buffer configured for receiving at least one transport mover or carrier for at least one packaging apparatus and no buffer for at least one packaging apparatus, wherein the buffer in particular comprises at least one path section or a plurality of path sections of the path system.

Only a subset of portions, e.g. of part portions of the same kind, can in particular be buffered in the buffer. This is, for example, conceivable with only one or two slicing apparatus. The buffered part portions can subsequently each be called up from the buffer to match the currently sliced further part portions and can be combined therewith to form a multi-sort portion. It would, for example, be conceivable first to pre-produce 60 portions A, e.g. summer salami, by means of a slicing apparatus and 60 portions B, e.g. pepper salami,—by means of the same slicing apparatus or by means of a different slicing apparatus—and to buffer them in buffers. While subsequently 60 portions C, e.g. ham, are additionally sliced, the portions A and B can be called up from the buffers and can be added to the output side of the path system.

The product most suitable for storage can in particular be sliced and buffered first. Furthermore, the order of the slicing process can e.g. also be observed such that a cleaning after every product change can be dispensed with. The described formation of multi-sorts is in particular advantageous with product sorts that, where possible, do not require any intermediate cleaning and no conversion effort at the slicing apparatus. Furthermore, the quality of the products should not suffer due to the intermediate storage on the buffer. In addition, a number of portions that it is as uniform as possible can be generated from the different products to avoid any residues arising.

The path system thus in particular makes possible the processing of small loads and/or of frequently changing products. A large variant variety can also be achieved with multi-sort packs. In conventional conveying systems with the known plant constellations of linear form in the throughput, this operating procedure could only be implemented in an economic manner with difficulty.

In accordance with a further embodiment, the control device controls the slicing operation and the transport movers such that uniform portions are packaged using at least one packaging apparatus and mixed portions of a combination of part portions, in particular of a different sort and/or of a different form, can be packaged using at least one packaging machine. The transport movers for producing the mixed portions are preferably grouped in a predefined order before the reaching of a packaging apparatus. The part portions can in this manner be placed in a desired arrangement in a packaging.

A dynamic switchover is in particular possible in this respect such that e.g. the supply of the respective packaging apparatus by the transport movers can be changed. The transport movers can preferably be traveled to a specific packaging apparatus in accordance with a predefinable criterion, e.g. the desired portion weight.

The preparation of a multi-sort pack can in this respect take place directly by a corresponding portion transfer to the packaging apparatus or by a multi-sort former connected upstream. In the latter, mixed portions are first prepared before they are output to the packaging apparatus.

In accordance with a further embodiment, at least one transport mover is branched off together with a part portion from a main stream, preferably from a path section that leads to a first packaging apparatus. The branching off in particular takes place for generating a mixed portion with or before a further packaging apparatus.

Mixed portions can thereby in particular additionally be produced, at least temporarily. Subsets of portions can thus be channeled out of a main product stream into a secondary product stream. The subsets can then each form a part portion of a multi-sort portion. The system in accordance with the invention in this manner makes possible both the formation of mono-sort packs, that is packs that only include one food sort, and the preparation of multi-sort packs that comprise a mixture from the product stream at the input side. The main product stream can in this respect in particular be conveyed to packaging apparatus for mono-sorts or can be processed by at least one associated packaging apparatus per product sort. The main product stream preferably forms a larger throughput volume than the secondary product stream. A packaging apparatus having a comparatively low performance can thus e.g. be used for multi-sort packs.

In this manner, the performance of a slicing apparatus can be fully utilized, on the one hand, and a slicing operation can be ensured that is as continuous as possible. On the other hand, the required number of portions can always be available for the formation of multi-sort packs. Since mixing portions are produced at the output side with the aid of flexibly controllable transport movers, there is no dependence or only a small dependence on the slicing procedure. There is in particular also no dependence on the product size. It is thus e.g. not important if individual product sorts, in particular salami, are shorter than others, in particular ham. The formation of product residues is consequently not critical and the loading times or loading cycles at individual slicing apparatus can in particular differ without this resulting in greater cycle changers at the discharge side.

The cycle of the packaging apparatus can preferably slow down somewhat in the main product stream that is proportionally much larger or the cutting performance can be correspondingly increased by the number of additional portions to compensate the portions branched off as a secondary product flow.

Since only the transport movers actually required for portions are moved in the path system, the best possible hygiene results. In conventional systems, a path system namely already has to be cleaned after a brief operation with a secondary product stream, which in particular results in an interruption in the production routine.

The transport movers can in particular carry a portion and can additionally each have a data set relating to the portion that can in particular be tracked by the control device. A sorting of the part portions is thereby made possible in a branched off secondary product stream, e.g. by an overtaking of transport movers. In this manner, a part portion of a first sort low in weight can, for example, be combined with a part portion of a second sort high in weight. A desired multi-sort portion can thus reach a predefined desired weight after a combining of the different part portions.

In accordance with a further embodiment, a hygiene sluice can be provided in which subsets of portions channeled out move with the aid of the transport movers on the path system, for example into an adjacent slicing and/or packaging space. In this respect, at least one ventilation apparatus can in particular be provided in the region of the transition, e.g. with or without an air conditioning and/or sterilization.

Alternatively or additionally, a cleaning, in particular a disinfection, of the transport movers can also be provided before the passage through or return from the adjacent slicing and/or packaging space. In this respect, individual slicing and/or packaging spaces can preferably be operated in parallel, in particular independently, next to one another. Cross-contamination can be prevented in this manner.

The transport movers can in particular pick up a portion at a slicing apparatus on the path system and can then leave the respective delineated space. An adjoining buffer and/or sorting region of the path system can in turn form a zone. A passage through or a return from this zone to the slicing space is preferably only possible for the transport movers via a sluice after an output of the respective portions. The transport movers can in particular only leave this zone again when they have been cleaned.

In accordance with a further embodiment, all the part portions originate from a respective one buffer, in particular a different buffer. The portions can accordingly be stored intermediately and can be combined to form a mixed portion as required.

In accordance with an alternative embodiment, at least one portion originates from a buffer and at least one part portion does not originate from a buffer, with the latter in particular being conveyed on a direct route from the slicing apparatus to the packaging apparatus. To prepare a mixed portion, one part portion can thus originate from a buffer and another can be conveyed directly, i.e. without being buffered, from the slicing apparatus to the packaging apparatus. Such a preparation of mixed portions can be implemented in a simple manner using the transport movers in accordance with the invention. In conventional belt conveying systems, this would be associated with a substantial construction effort and/or expense.

In accordance with a further embodiment, the control device controls the transport movers such that they are moved, in dependence on a criterion, at least temporarily not directly, in particular not at all, to a slicing apparatus and/or to a packaging apparatus, wherein the criterion depends on the performance and/or kind of the slicing apparatus or packaging apparatus, on the product, on the portion, on a format formed by a plurality of arranged portions and/or on a predefinable operating state.

If a slicing apparatus or a packaging apparatus is not traveled to directly, but rather bypassed, this bypass route can be used, for example, to clean the transport movers. The other components of the system can in contrast continue to produce.

If a slicing apparatus or a packaging apparatus is not traveled to by the transport movers at least temporarily and if a corresponding path section is not used, the slicing apparatus, the packaging apparatus and/or corresponding sections can be cleaned, serviced and/or repaired. This is in particular ensured in that the path system can work at a variable speed with the individual transport movers. Individual transport movers or subsets of transport movers having portions can thus be individually accelerated or decelerated. Other path sections can e.g. be used in this respect. Loading breaks at individual slicing apparatus can also be bridged in this manner, optionally also by a preproduction of portions or by a performance increase at other slicing apparatus. A continuous product stream can thus be ensured substantially independently of the performance of an individual slicing apparatus or of an individual packaging apparatus.

In accordance with a further embodiment, a plurality of slicing apparatus and exactly one packaging apparatus are provided. The performance of the slicing apparatus can in particular be smaller than the performance of a packaging apparatus, with the performance corresponding to the number of portions that can be generated or packaged per unit of time.

An individual packaging apparatus can in this manner be supplied with portions from different slicing apparatus. This is e.g. advantageous in the preparation of mixed portions. The transport movers or the portions located thereon can in particular be buffered on the way to the packaging apparatus. It is also possible to buffer at least some transport movers while other transport movers are conveyed on a direct route from a slicing apparatus to the packaging apparatus.

In accordance with a further embodiment, the control device controls the transport movers such that they are moved, in dependence on a criterion, at least temporarily not directly, in particular not at all, to a slicing apparatus, wherein the criterion in particular depends on the performance and/or kind of the slicing apparatus or packaging apparatus, on the product, on the portion, on a format formed by a plurality of arranged portions and/or on a predefinable operating state. Individual slicing apparatus can thus be bypassed in order, for example, to be cleaned or serviced. A slicing apparatus can also not be traveled to by a transport mover when the slicing apparatus is, for example, loaded with a new product and the product is prepared for the slicing process, e.g. by a removal of the first piece.

In accordance with a further embodiment, exactly one slicing apparatus and exactly one packaging apparatus are provided. The path system in accordance with the invention can thus also be used in small systems. A flexible assembly of portions is also possible in this respect.

In accordance with an embodiment, the path system comprises distribution points that split a track coming from the slicing apparatus into a plurality of functional tracks. The distribution points thus in particular divide a single-track path section that leads away from the slicing apparatus into at least two path sections that are configured as functional tracks. The functional tracks can satisfy any desired function and can, for example, serve as a buffer. Part portions can thus be buffered in order in particular to generate mixed portions even though only a single slicing apparatus and a single packaging apparatus are present.

In accordance with a further embodiment, the path system comprises connection points that combine a plurality of functional tracks to a single track leading to the packaging apparatus. The transport movers can thus again be led together on a common track and can be supplied to a common packaging apparatus even though they originate from different functional tracks. The path system makes possible in a simple manner both a division into a plurality of tracks and a combination of a plurality of tracks.

In accordance with a further embodiment, each functional track comprises a buffer for receiving at least one transport mover or carrier or is itself formed as a buffer. A buffer can in this respect e.g. comprise one or more parallel path sections. All the part portions can in this respect originate from the buffers to generate a mixed portion.

Alternatively, at least one functional track comprises a buffer configured for receiving at least one transport mover or carrier or the functional carrier is itself formed as a buffer, with at least one functional track not comprising a buffer and not being formed as a buffer. To generate a mixed portion, a part portion can in this respect be conveyed directly from the slicing apparatus to the packaging apparatus, while the remaining part portions can originate from the respective buffers.

In accordance with a further embodiment, a plurality of functional tracks are configured for the transport, for the processing, for the combining and/or for the buffering of portions or part portions of different sorts. Functional tracks can, for example, also serve to clean the transport movers. The functional tracks can thus be used in a versatile manner.

In accordance with a further embodiment, the path system comprises at least one passing line that bridges a path section that leads to a slicing apparatus and/or to a packaging apparatus. A slicing apparatus and/or a packaging apparatus can be bypassed in this manner. This is in particular advantageous when a corresponding slicing machine or packaging machine has temporarily not been put into operation, for example for purposes of repair, servicing and/or cleaning. The slicing apparatus or the packaging apparatus can also be bypassed if this is necessary for operational reasons, e.g. if a new product is placed into the slicing apparatus and the first piece has been removed. If a plurality of slicing apparatus or a plurality of packaging apparatus are provided, further portions can always be cut off and packaged while individual slicing apparatus or packaging apparatus are at least temporarily bypassed. A continuous portion stream is thereby made possible e.g. even during maintenance work.

In accordance with a further embodiment, the path system comprises at least one return transport line that branches off from a path system that leads from a slicing apparatus to a packaging apparatus and opens downstream into the path section again. A kind of loop is consequently in particular provided, whereby the same path section can be traveled through a plurality of times. The return transport line is in particular configured as a side track that serves, for example, as a return route for a transport mover against a main conveying line.

In accordance with a further embodiment, the return transport line is configured to again supply a transport mover to the slicing apparatus or to a different unit of the path system. Portions can be placed onto the transport mover in an overlapped and/or offset manner in this fashion. A passage is repeated in this respect.

The return transport line can alternatively or additionally also be configured to channel a transport mover onto the path section for a part coverage of the path system. This in particular serves for the protection of the rail system in regions that are particularly at risk of contamination, e.g. beneath a feed. For this purpose, the transport mover also called a cover mover can move along at least section-wise between two transport movers carrying two portions such that the rails are covered by the cover movers in the regions at risk of contamination. The cover mover can also wait under a feed region for so long until the next transport mover arrives to receive a portion. A normal transport mover without a portion can be used as the cover mover. The cover mover can alternatively be designed such that an overlap is achieved with a following carrier at at least one side.

It is also conceivable that the return transport line is configured to channel put a transport mover having cutting residues or faulty portions, in particular incomplete portions or incorrectly positioned portions, from the path section. Sliced product residues can be collected or led off in this manner. For this purpose, a specific waste transport mover can be provided that moves along section-wise or time-wise in the main stream such that it can be unloaded after a reception of the slicing residues on the return transport on the return transport line, e.g. in that the slicing residues are combed off or blown off. Alternatively, incomplete portions or incorrectly positioned portions can also be corrected by hand, semi-automatically or fully automatically. Once the portions have been corrected, the transport movers can be channeled into the main stream again.

The return transport line can furthermore also serve as a buffer line and/or as an overtaking line, e.g. for a weight sorting, for a classification of individual portions and/or for a pre-classification of individual portions for total portions to be prepared. The order of the transport movers before an output point, e.g. before a robot, for example a so-called picker, or feed of a packaging apparatus, can in particular be fixed on the return transport line. The return transport line in particular also enables another gripping possibility for a picker of a robot unit on an additional passing on the main track or on the side track.

In accordance with a further embodiment, a robot device, preferably having a picker, is provided for transferring portions from the conveying apparatus to the packaging apparatus, with a robot device in particular being provided for every packaging apparatus. Three robot devices can, for example, be provided that place the portions in packages to transfer the portions to a packaging apparatus or to a plurality of packaging apparatus. For this purpose, at least a part line of the path system can be arranged in the feed region in parallel with a transfer region of a packaging apparatus and as closely as possible next to it in order to ideally utilize the range and the working region of the robot device, in particular of the picker.

In accordance with a further embodiment, the path system in accordance with the invention can be integrated into a conventional belt conveyor system. Transfer points for portions can e.g. in particular be provided at which portions are transferred between at least two separate conveying systems. In this respect, for example, two different conveying systems can be provided, preferably a transport mover circuit and a conventional belt system in the region of the slicing apparatus. The portions can in particular be transferred from the conventional belt system to the transport mover circuit that e.g. only conveys the secondary product stream to form a multi-sort pack.

A blade-edge belt or a transport apparatus, in particular having straps engaging into the transport movers, having at least one conveyor belt or having at least one robot device can in particular be provided for receiving and/or outputting the portions from the conveyor belt to the path system. The portions can be loaded via the blade-edge belt from a conveyor belt onto the transport movers. If the transport movers are first conveyed using a conveyor belt, straps can engage in a meshing manner into slits of the transport movers to move them onto the path system. Straps can also engage into the transport movers on the transfer of the transport movers from the path system to a conveyor belt. Portions can thus be transferred in a simple and inexpensive manner from a conveyor belt to the path system or from the path system to the conveyor belt. Alternatively, at least one robot device, preferably having a picker, can be provided in the loading region or in the unloading region. The robot device can e.g. transfer portions, the carriers and/or the transport movers from a conveyor belt onto the path system or from the path system onto a conveyor belt.

The portions can thus in particular first move onto a portioning belt after the cutting off. In this respect, they can be conveyed off via a conventional control belt and can finally be transferred to a path system as a multifunctional intermediate member. A feed apparatus can be provided at feed points and transfers the portions to the transport movers of the path system. In this respect, a part line of the path system can be led through beneath a feed belt having the same longitudinal alignment. The portions can in this respect be transported over the feed belt onto the transport movers. Optionally, a part line of the path system can also be guided transversely, i.e. at a right angle, to the feed belt at the feed point, for example to place a part portion having a different orientation onto a transport mover.

Each part line of the path system to a feed point at a slicing apparatus can preferably be formed as a secondary line of the total path system. The transport movers can branch off onto this secondary line to collect portions. In normal operation, the transport movers simply move through along the line system and thus bypass the respective slicing apparatus if no portions are to be collected there.

The portions can subsequently be conveyed to a packaging apparatus via the transport movers. The transfer of the portions can in this respect take place either directly from the path system into the packaging apparatus or by an interposed feed in front of the packaging apparatus.

Alternatively, the portions can also be placed onto the transport movers directly after the slicing. The transport movers can subsequently be moved by the path system. The portions can finally be output to a packaging apparatus. In this case, the total system is configured as a path system.

In both cases, transverse connections having points can be provided in the path system for the return route from the feed region of the packaging apparatus to the slicing apparatus. In this manner, the transport movers can be led on a direct route to the respective slicing apparatus and do not have to carry out any complete path circuit. Furthermore, overtaking procedures, buffer regions and/or parking regions and/or a pre-sorting of, for example, empty transport movers can thus be implemented. Transport movers not required can in particular park in the line region of a stationary slicing apparatus such that the revolving quantity of transport movers or portions is reduced.

In accordance with a further embodiment, at least one buffer formed for receiving at least one transport mover or carrier is associated with each robot device. It can, for example, have a plurality of parallel lines of the path system having points in the inflow or outflow regions. Completed multi-sort portions or mono-sort portions can be buffered there, for example. Part portions for multi-sort portions can also first be sorted there and can move in a predefined order into the following feed region of a packaging apparatus or into the working region of at least one robot device.

In accordance with a further embodiment, the path system has at least one unloading path that leads through an unloading region in which at least one packaging apparatus, in particular a plurality of packaging apparatus, is/are arranged next to one another. The portions can be transferred from the transport mover to the packaging apparatus in the unloading region. The portions can in this respect be picked up by a robot device. It is alternatively also possible that the portions are combed off the transport movers. It is furthermore also conceivable that the carrier of the transport mover is configured as a transport belt and thus conveys the portions located thereon onto the packaging apparatus. A transport mover can in particular also travel to a plurality of transfer regions of packaging apparatus and can thus, for example, output a respective part portion to different packaging apparatus.

In accordance with a further embodiment, the unloading region extends at least section-wise in parallel with a transfer region of a packaging apparatus and in particular leads closely past the packaging apparatus. A transfer of the portions to the packaging apparatus is facilitated in this manner. The portions are in particular located in the active region of the robot device.

In accordance with a further embodiment, at least part regions of the unloading path lead through the unloading region several times. The unloading path in particular describes a 180° curve after crossing the unloading region in a first unloading line and again leads through the unloading region in a second unloading line, preferably on at least one part line in parallel with the first unloading line. A path section of the path system can thus first pass through a working region of at least one robot device and subsequently turn round again. The transport movers of the path system can thus run through the working region of the robot devices again on the return route and can be moved back on a further path section in parallel with the first path section, in particular as closely as possible next to the first path section. The robot device can thereby pick further part portions from the working region on the return route of the transport movers. This means more selection possibilities of part portions, e.g. based on weight criteria, for the robot device. Cycle advantages and/or quality advantages in particular result in this manner. An exact target weight of a mixed portion that consists of a plurality of part portions can thus be achieved, for example.

In accordance with a further embodiment, a plurality of unloading paths, in particular all the unloading paths, lead through all the packaging apparatus in a plurality of unloading regions. The composition of the portions has a particularly variable design in this manner. Depending on requirements, each packaging apparatus or robot device can thus access any desired part portions of all the transport movers.

Alternatively, with a plurality of unloading regions at least one unloading path leads through a plurality of transfer regions, in particular all of the transfer regions, of the packaging apparatus and at least one unloading path does not lead through at least one transfer region of a packaging apparatus. An unloading path can in particular be associated with a transfer region of a packaging apparatus. In this embodiment, each transport mover is not led past each packaging apparatus so that shorter route lines are possible for the transport movers. Both path material and time are saved in this manner.

The invention also relates to a method of moving portions that each comprise at least one slice cut off from a food product by means of at least one slicing apparatus, in particular a high-speed slicer, in which the portions are moved by means of a plurality of individually movable transport movers that are moved to at least one packaging apparatus, in particular distributed and/or associated with a track and are packed there by means of a control device in a path system along at least one predefined path, wherein the transport movers each comprise at least one rotor cooperating with the path system and at least one carrier for portions attached to the rotor.

In accordance with an embodiment, at least one transport mover is moved past the slicing apparatus a plurality of times to arrange the portion in a predefined format, in particular with mutually offset slices, and/or to receive part portions after one another and to combine them to form a total portion. The path system can in this respect in particular comprise a circular path section. In this manner, the transport mover does not have to be moved back again, but can rather always be driven in the same direction and can be moved past the slicing apparatus several times. It is, however, alternatively also possible to move the transport mover toward the slicing apparatus and back again on the same route and toward the slicing apparatus again. The transport mover can also first be traveled to the slicing apparatus to receive a first part portion there. The transport mover can subsequently be moved onward slightly to receive a second part portion. The individual part portions in this respect form a format having slices arranged offset with respect to one another, for example in two rows next to one another.

In accordance with a further embodiment, the transport mover is moved past the slicing apparatus consecutively in different paths, in particular two or more different paths. The tracks are guided in parallel next to one another at least in the feed region and can in particular be configured as circular paths having different radii. In this manner, the slicing apparatus itself does not have to be adjusted to generate offset part portions. The transport mover is e.g. moved once in a circular path having a smaller radius and once in a circular path having a larger radius such that the part portions are automatically placed on the transport mover at different, parallel positions.

It is alternatively or additionally also possible that a feed of the slicing apparatus is adjusted relative to the path. The transport mover can in this respect in particular be moved on a single circular path while the part portions can be placed at different positions of the transport mover due to the movement of the feed. A pivoting of the feed to the side with respect to the path, for example, produces a parallel offset of part portions on a transport mover.

Formats in which the part portions are arranged offset from one another can thus be formed in a simple manner.

All the embodiments of the system described here are in particular configured to be operated in accordance with the method described here. Furthermore, all the embodiments of the system described here as well as all the embodiments of the method described here can each be combined with one another.

The invention will be described in the following by way of example with reference to the drawings. There are shown:

FIGS. 1 to 16 respectively, a schematic plan view of a possible embodiment of a total system in accordance with the invention.

It must first be noted that the embodiments shown are of a purely exemplary nature. The number and the extents of the path sections shown and the number of the slicing apparatus shown and/or the number and the kind of packaging apparatus can in particular vary. For example, in some Figures only single-track systems or path sections are shown in schematic representations. These systems can be designed with multiple tracks and can also be provided with corresponding return lines, in particular for returning empty transport movers. The shown deep-draw packaging apparatus can in particular be replaced as desired with tray packaging apparatus and vice versa. The features of an embodiment can also be combined as desired with features of another embodiment.

The embodiments of the invention described in the following are based on a drive principle for transport movers in a path system by linear synchronous motors (LSM drive) such as was explained by way of example in the introductory part with reference to the transport system of the company of MagneMotion, Inc. As many movers as desired in a path system which is as complex as desired can be moved individually, i.e. independently of one another, in the path system by means of a control device and can be localized and identified by means of the control device. The movers can furthermore be moved and positioned with extremely high precision in the path system. The movement speeds and accelerations and decelerations for the movers can likewise be carried out as desired and individually.

The movers are not shown in the drawings. They can be configured as rotors that can move over a path section of the path system 10. The path system 10 comprises a base serving as a stator of the LSM drive which also serves as a mechanical base for attaching the path section, for example, to a substructure or at racks or holders of any desired form. The path section can be configured as a so-called U type, i.e. the path section can be upwardly open while the movers are located above the stator.

Guide rails that are formed as angled metal sheets and that run in slits that are formed at the side surfaces of the rotors of the movers can serve as a guide for the movers. The guides of the path system for the movers can, however, also be differently configured.

The guide of the path system provides a defined relative position of the rotor with respect to the stator. It is in particular hereby achieved that a permanent magnet arrangement of the rotor observes an exactly defined spacing from the stator.

In accordance with the LSM drive, the rotor provided with a permanent magnet arrangement is movable by a corresponding control of the stator by means of a control device in the direction of transport along the stator and thus in the path comprising the stator. The rotor can be guided by the guide rails during this movement.

A carrier can be arranged at the rotor and provides a support surface, which is planar, for example, to transport food portions.

The carrier can be fixedly connected to the rotor. The carrier can alternatively also be releasably attached to the rotor. The path system 10 on which the movers can be moved is, as shown in FIG. 1, arranged as a flexible intermediate element between a slicing apparatus 12 and packaging apparatus 14, 15. The slicing apparatus 12 can comprise a circular blade or a scythe-like blade revolving in a rotational manner and/or in planetary motion. A plurality of food products can in particular be sliced simultaneously by the slicing apparatus 12.

The packaging apparatus 14, 15 can be configured as deep-draw packaging apparatus 14 or as tray packaging apparatus 15 and can be arranged next to one another in the sense of a parallel connection. Since different packaging apparatus 14, 15 are provided, fluctuations in the product supply can be compensated, for example. Portions of the same system can also be packaged in a different manner. This flexibility is in particular made possible by the path system 10. This is shown as a black box in FIG. 1. The individual path sections of the path system 10 can in this respect generally be arranged in any desired manner and can connect the slicing apparatus 12 to the packaging apparatus 14, 15 in different manners.

Figure 2:
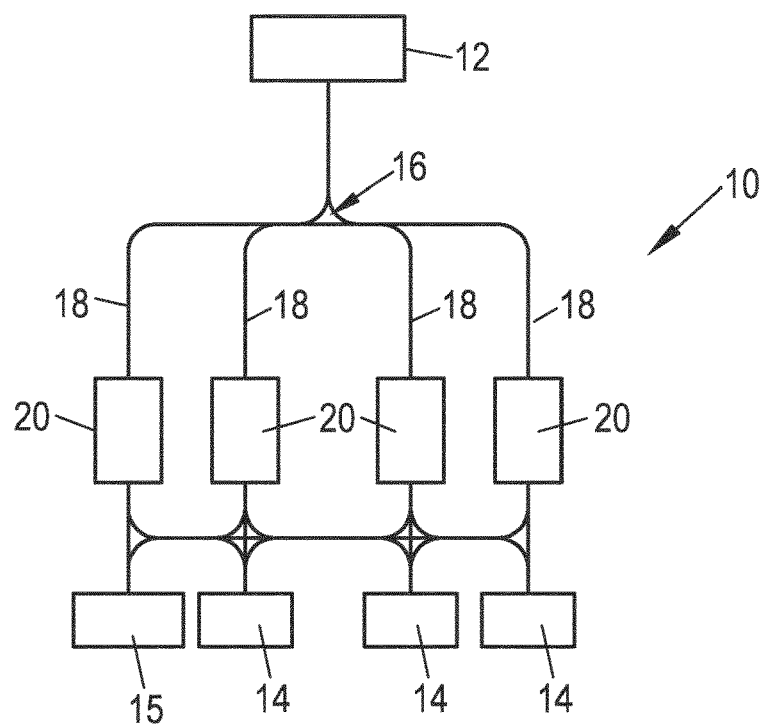

A possible embodiment of a path system 10 is shown in FIG. 2. An individual slicing apparatus 12 supplies a plurality of packaging apparatus 14 and 15 respectively. The shown division into deep-draw packaging apparatus 14 and tray packaging apparatus 15 is in this respect purely by way of example and can be varied as desired. All the packaging apparatus 14, 15 can in particular also all be of the same type.

The track of the path system 10 coming from the slicing apparatus 12 is split at distribution points 16 into four functional tracks 18. The functional tracks 18 each have a buffer 20. The buffer 20 can be configured as a separate component. A parallel path section can also be provided on which the movers are buffered. The transport movers are subsequently steered to the packaging apparatus 14, 15. The portions are subsequently packaged. If a transport mover has output a portion, the transport mover can thus be moved back to the slicing apparatus 12 again on a return track, not shown.

A transversely extending path section can also be provided before the packaging apparatus 14, 15 such that the portions are supplied to any desired packaging apparatus 14, 15 from the buffers 20. Mixed portions can in particular thus be generated in a simple manner. Portions of different sorts can thus be buffered in the buffers 20 and can be supplied as required to a corresponding packaging apparatus 14, 15. The generation of portions of exact weight is also considerably facilitated by the path system 10 in accordance with the invention since portions can be supplied on the basis of their weight to a corresponding packaging device 14, 15.

Figure 3:
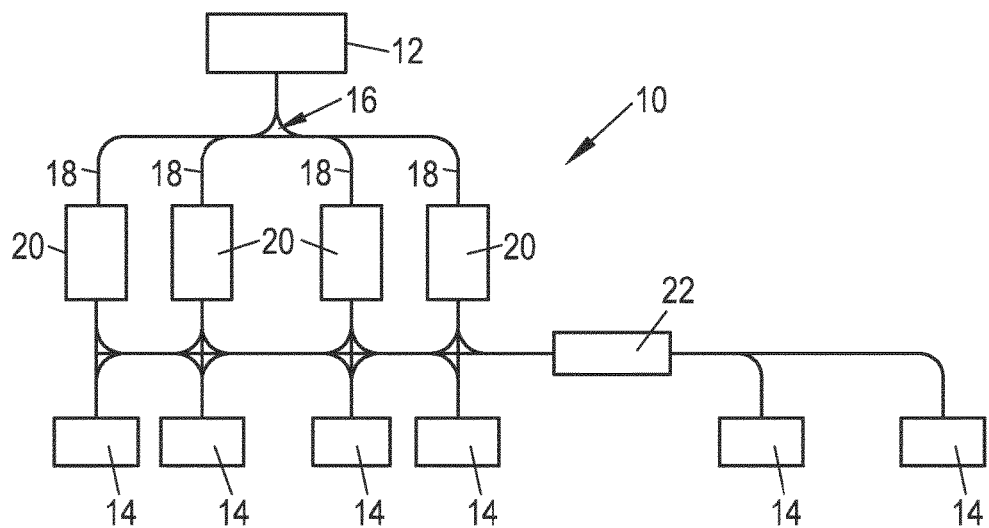

In the embodiment shown in FIG. 3, a multi-sort former 22 is provided. Transport movers can in this respect in particular be traveled to the multi-sort former 22 and unload part portions. The formed mixed portions can subsequently be moved, for example with the aid of a transport mover or with the aid of a conveyor belt or of a picker, to the packaging apparatus 14 and can be packaged there. Alternatively, the part portions of different sorts can also be fed directly into the packaging apparatus 14.

It is possible in this manner that portions of one sort and mixed portions can be simultaneously or alternatively prepared and packaged. The transport movers can for this purpose as desired output the total portion or part portions to the packaging apparatus 14 or to the multi-sort former 22. The transport movers can be correspondingly controlled depending on whether a portion is to be packaged with a single sort or with a portion having different sorts.

Figure 4:
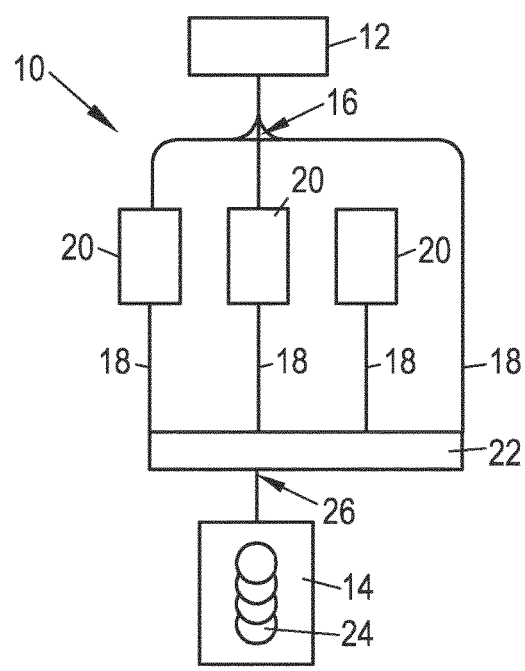

In the embodiment in accordance with FIG. 4, only one single slicing apparatus 12 and one single packaging apparatus 14 are provided. The generation of mixed portions 24 is also possible with this compact configuration.

Every functional track 18 can thus comprise a buffer 20, for example. As shown, it is, however, also conceivable that a functional track 18 does not have a buffer 20. Products of different sorts can first be buffered in the buffers 20 to generate a mixed portion. A further product sort can subsequently be sliced by the slicing apparatus 12 and can be conveyed in the functional track 18 without a buffer 20 to the multi-sort former 22. This part portion can be complemented to form a mixed portion 24 by part portions that are buffered in the buffers 20. The multi-sort former 22 in this respect also serves as connection points 26 to combine the individual functional tracks 18 to a common track and thus to convey the mixed portion 24 to a common packaging apparatus 14. The packaging apparatus 14 can in particular comprise a feed on which the mixed portions 24 can be placed. The multi-sort former 22 can in particular comprise one or more pickers to supply the part portions to the packaging apparatus 14.

Figure 5A:
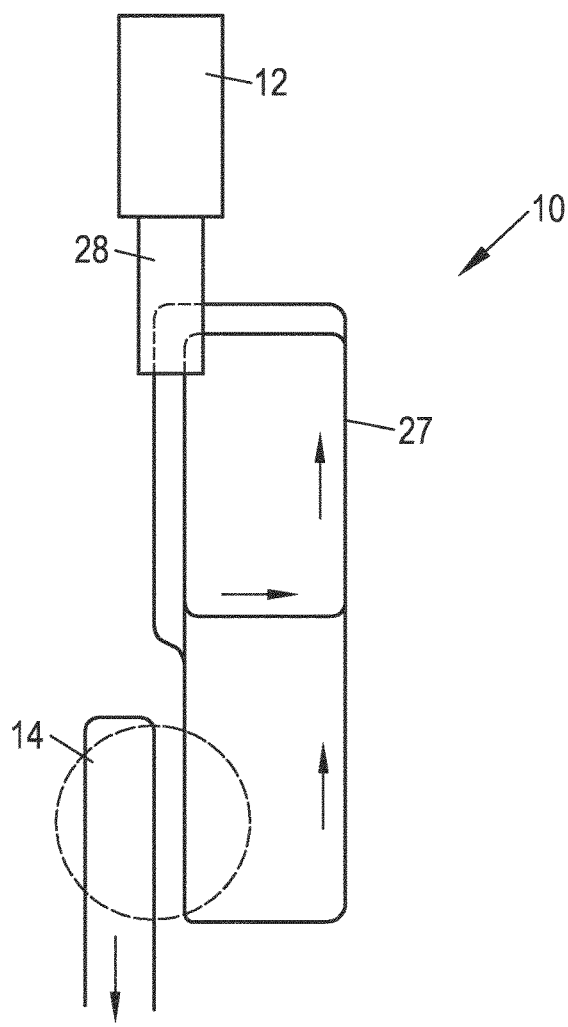

In accordance with the embodiment shown in FIG. 5A, the path system 10 comprises path sections that are configured as "lying 8s". The upper loop in this respect serves for the reception of portions, while the lower loop serves for the output of portions to a packaging apparatus 14 and for a return of the unloaded movers to the slicing apparatus 12. The transport movers can be guided several times through the upper loop. To form a desired format from part portions, a loop having a larger radius or a parallel offset can also be moved through in this respect. A placement of a second part portion offset with respect to the first part portion can thus take place even with a fixed position of a feed 28 of the slicing apparatus 10. The upper loop can alternatively also only have one track. If the loop is traveled through multiple times, the position of the feed 28 can be adjusted, whereby the part portions can be placed at different positions. The path section on which the movers are led back is also called a return transport line 27.

Figure 5B:
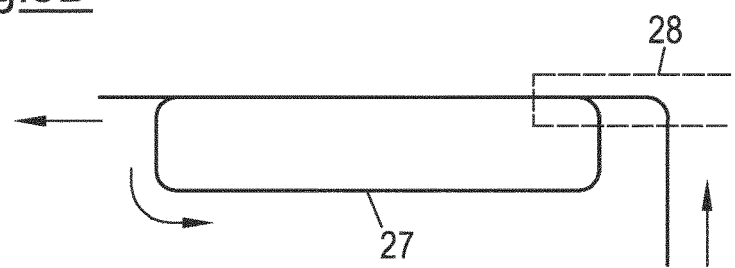

In the embodiment of FIG. 5B, a return transport line 27 branches off from the main stream and opens downstream into the main stream again. Movers that contain faulty portions can be channeled out, corrected and channeled back into the main stream on the return transport line 27. Movers that transport slicing residues can also be freed from these residues on the return transport line 27.

Since, for example, the region beneath a feed 28, e.g. a feed belt, is particularly prone to contamination, a cover mover can be channeled in via the return transport line 27 between two mutually following movers that are loaded with portions, said cover mover itself not transporting any portions and only serving to cover a region of the path system such that no product residues move onto the track.

Figure 6:
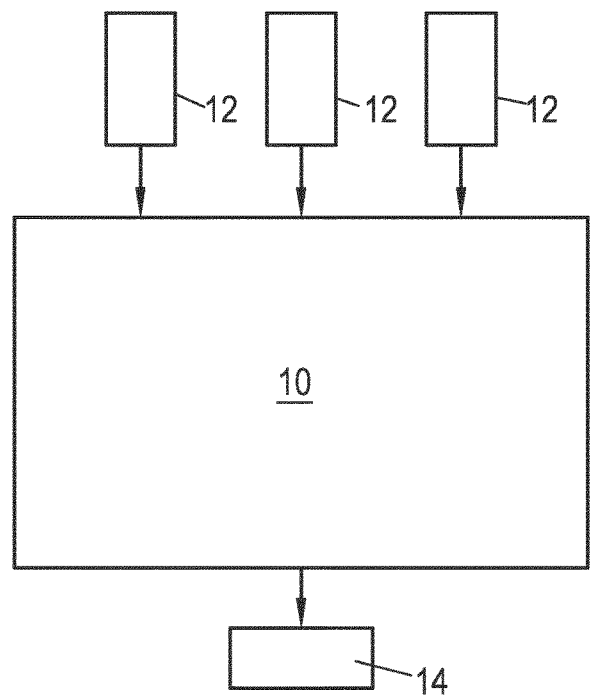

In the embodiment in accordance with FIG. 6, more slicing apparatus 12 than packaging apparatus 14 are provided. There are specifically three slicing apparatus 12 in comparison with a single packaging apparatus 14. The slicing apparatus 12 can be relatively small, simple slicing apparatus 12, in particular of only one track, that are combined with a high-performance packaging apparatus 14. The path system 10 is in this respect shown as a black box.

Figure 7:
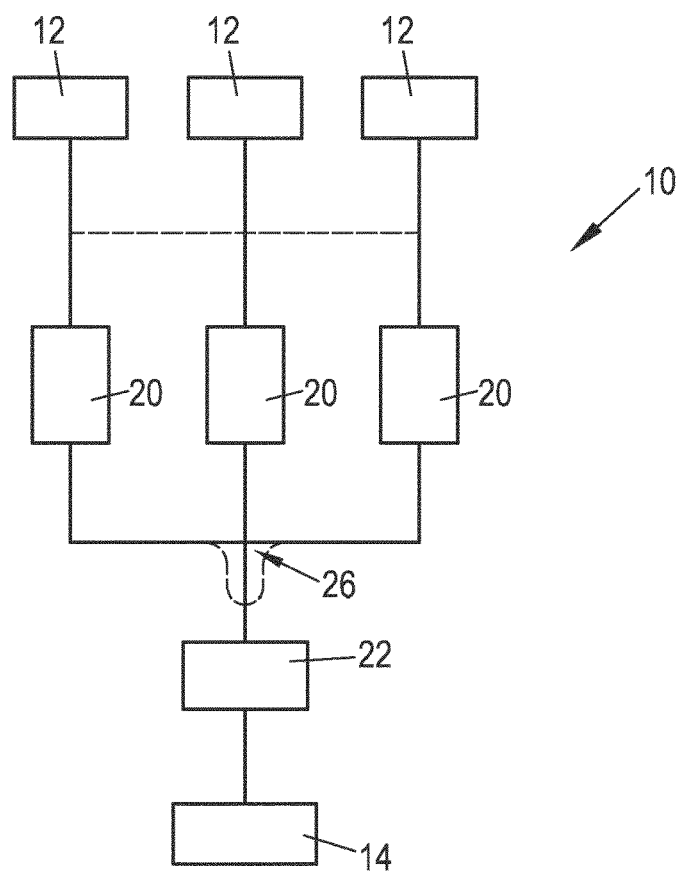

An exemplary embodiment with a corresponding path system 10 is shown in FIG. 7. A buffer 20 is associated with each slicing apparatus 12 in this respect. The separate tracks can be brought onto a common track via connection points 26 and can be supplied to a multi-sort former 22. The portions can subsequently be packaged by the packaging apparatus 14. The multi-sort former 22 is optional in this respect so that mono-sorts or multi-sorts can also be generated directly on the packaging apparatus 14.

Figure 8:
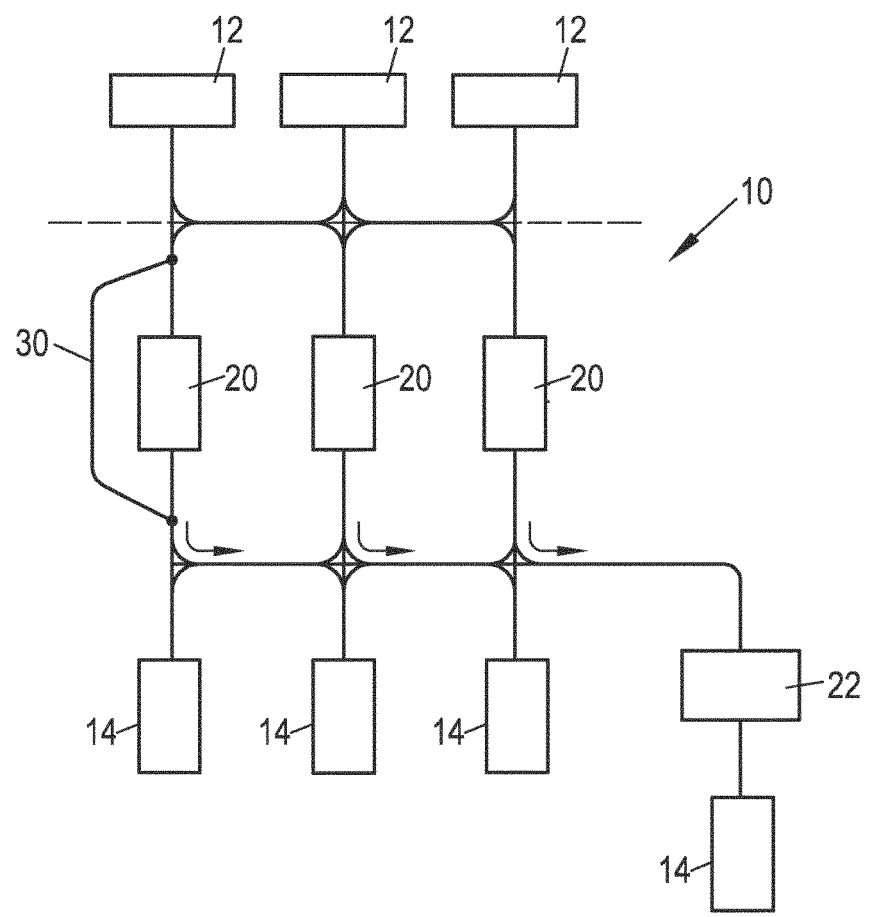

In the embodiment shown in FIG. 8, a plurality of slicing apparatus 12 and a plurality of packaging apparatus 14 are provided. A conventional conveyor belt can also be provided directly after the slicing apparatus 12, that is up to the dashed line. The portions can be transferred from the path system to the movers with the aid of a corresponding transfer apparatus, e.g. with a picker. Alternatively, this section can also already be taken up by the path system 10, with the portions moving directly from the slicing apparatus 12 onto the movers. A buffer 20 is associated with each slicing apparatus 12. The buffers 20 can, however, also be bypassed with the aid of a passing line formed as a bridge 30. Both mono-sorts and, in particular with the aid of the multi-sort former 22, mixed portions can be generated and subsequently packaged.

Part portions can also in particular be branched off for the generation of mixed portions.

Figure 9:
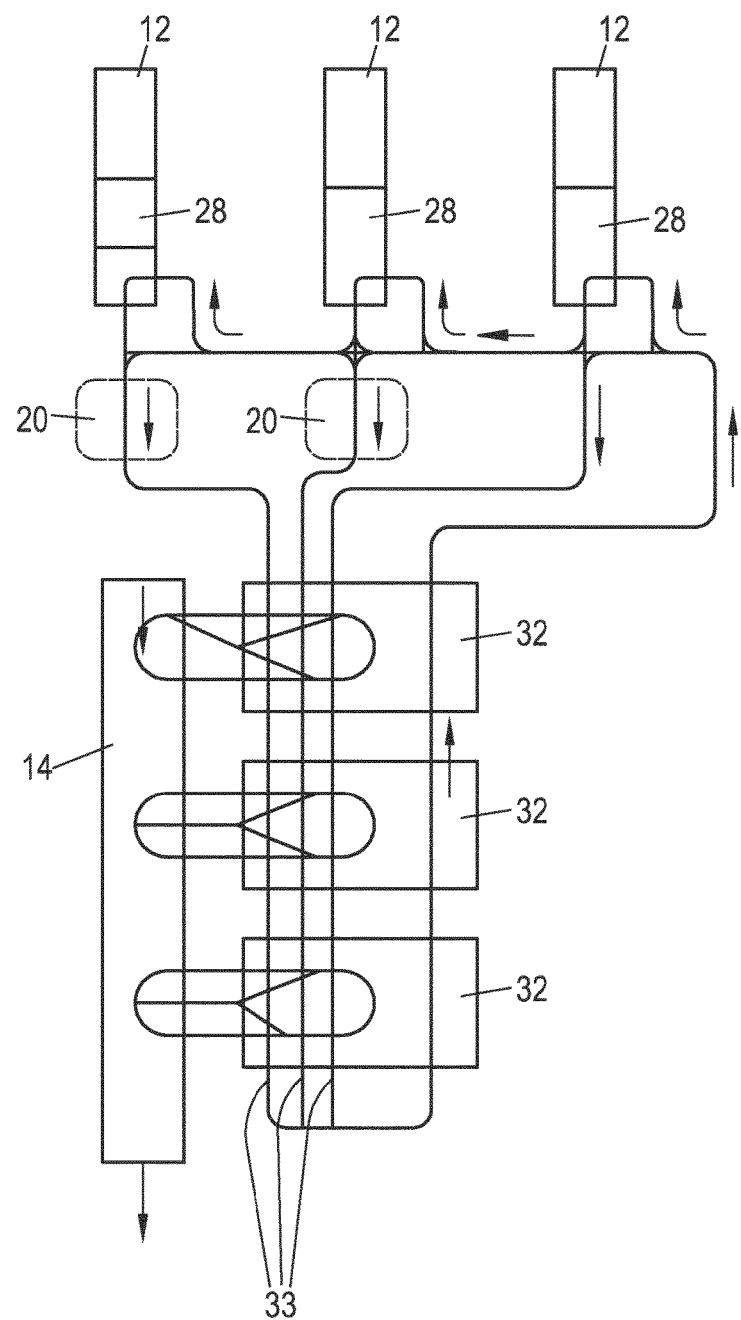

A further embodiment is shown in FIG. 9 in which three slicing apparatus 12 supply one packaging apparatus 14 with portions, with the portions being transferred to the packaging apparatus 14 with the aid of three robot devices 32. The portions can be output from the slicing apparatus 12 to the transport movers by means of feed belts 28. The transport movers can optionally be buffered with the aid of the buffers 20. The transport movers are subsequently moved past the robot devices 32 in an unloading track 33. Depending on the desired portion, part portions or the total portions can in this respect be picked up from the transport movers by the robot devices 32 and can be transferred to the packaging apparatus 14. Mixed portions can also be generated in this manner. After the portions have been removed from the transport movers, they are again moved back to the slicing apparatus 12 on a common path section.

Figure 10:
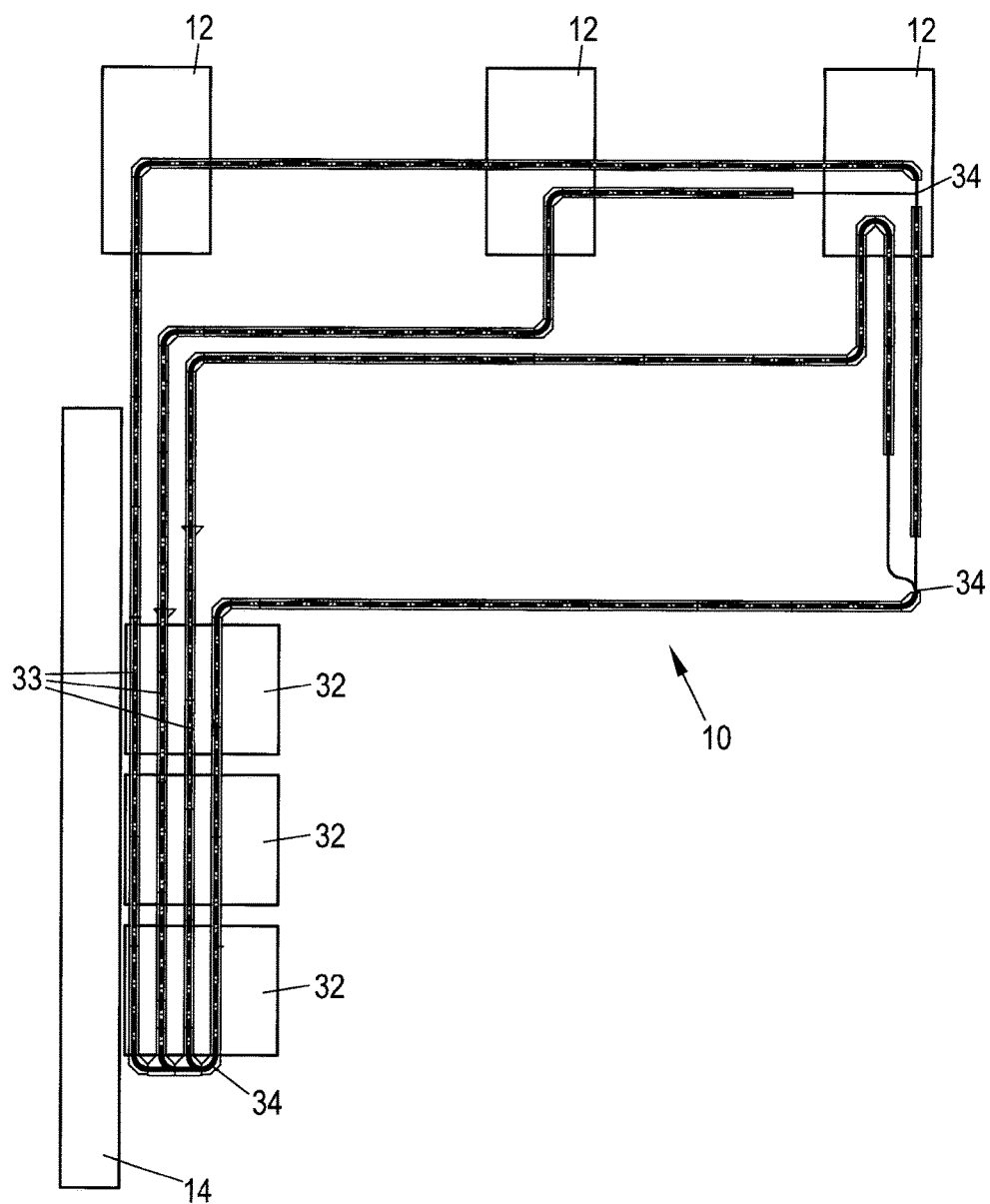

A similar situation is shown in FIG. 10. A path section in this respect runs past all three slicing apparatus 12. Subsequently, the transport movers are led past three robot devices 32 in the unloading track 33. A further path section is branched off that is only led past two slicing apparatus 12 and is then led to the robot devices 32. Finally, a third path section branches off that is only led past one slicing apparatus 12. In this manner, all the working regions of the robot devices 32 are engaged through by all path sections that convey transport movers having portions. After combining these path sections to a common return line in the direction of the slicing apparatus 12, the first part piece of this return line likewise runs through all three robot devices 32. Portions can also be picked up from the transport movers and transferred to the packaging apparatus 14 on the return path.

Figure 11:
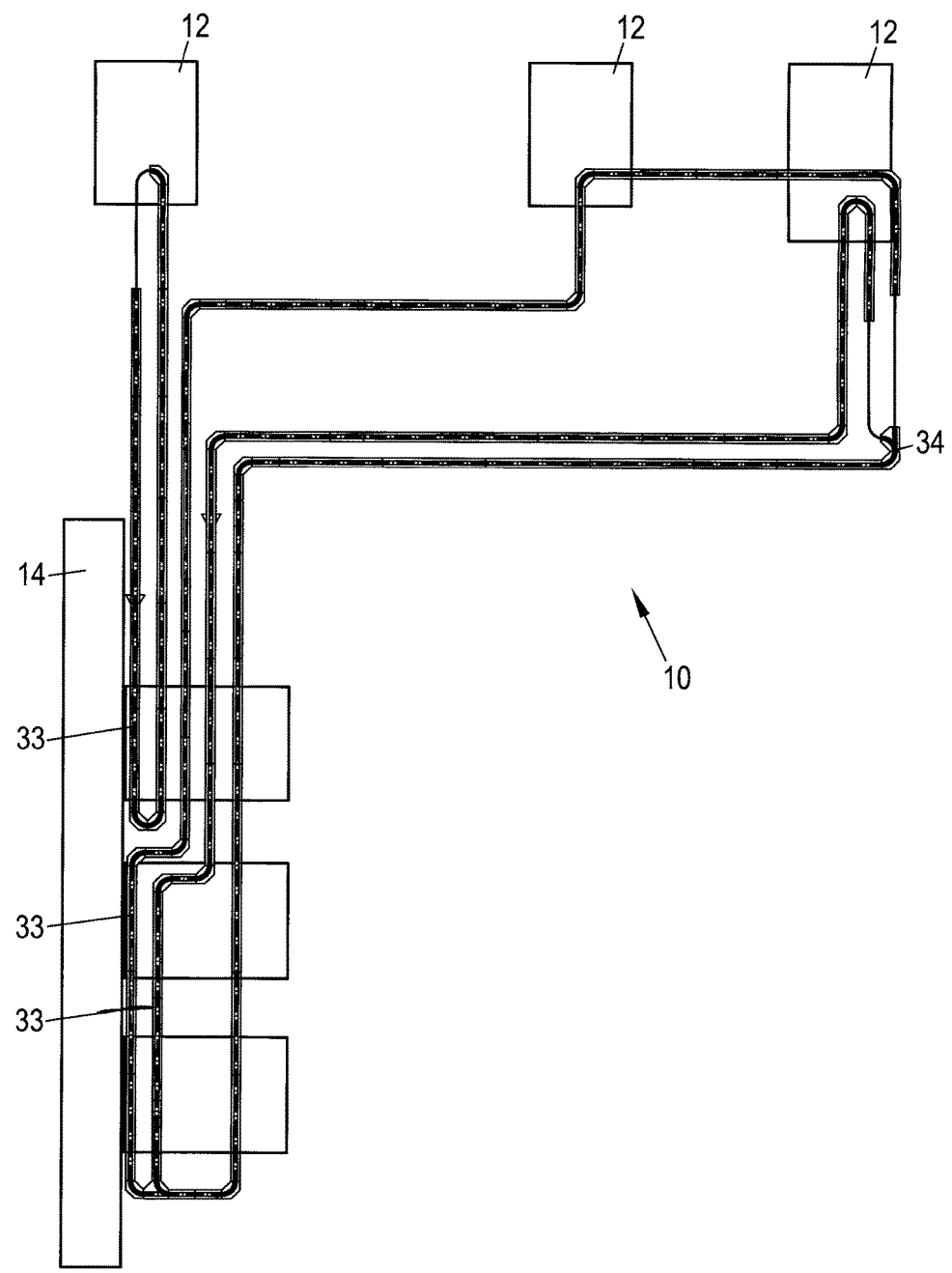

A further variant is shown in FIG. 11. In this respect, a slicing apparatus 12 is only connected to a single robot device 32 via an independent path section. A further path section leads via the other two slicing apparatus 12 to all three robot devices 32. Accordingly, a further path section is provided that is only led to a single slicing apparatus 12 to receive portions. After running through the robot devices 32, the last-named two path sections are moved into a common return line that runs through all three robot devices 32.

Figure 12:
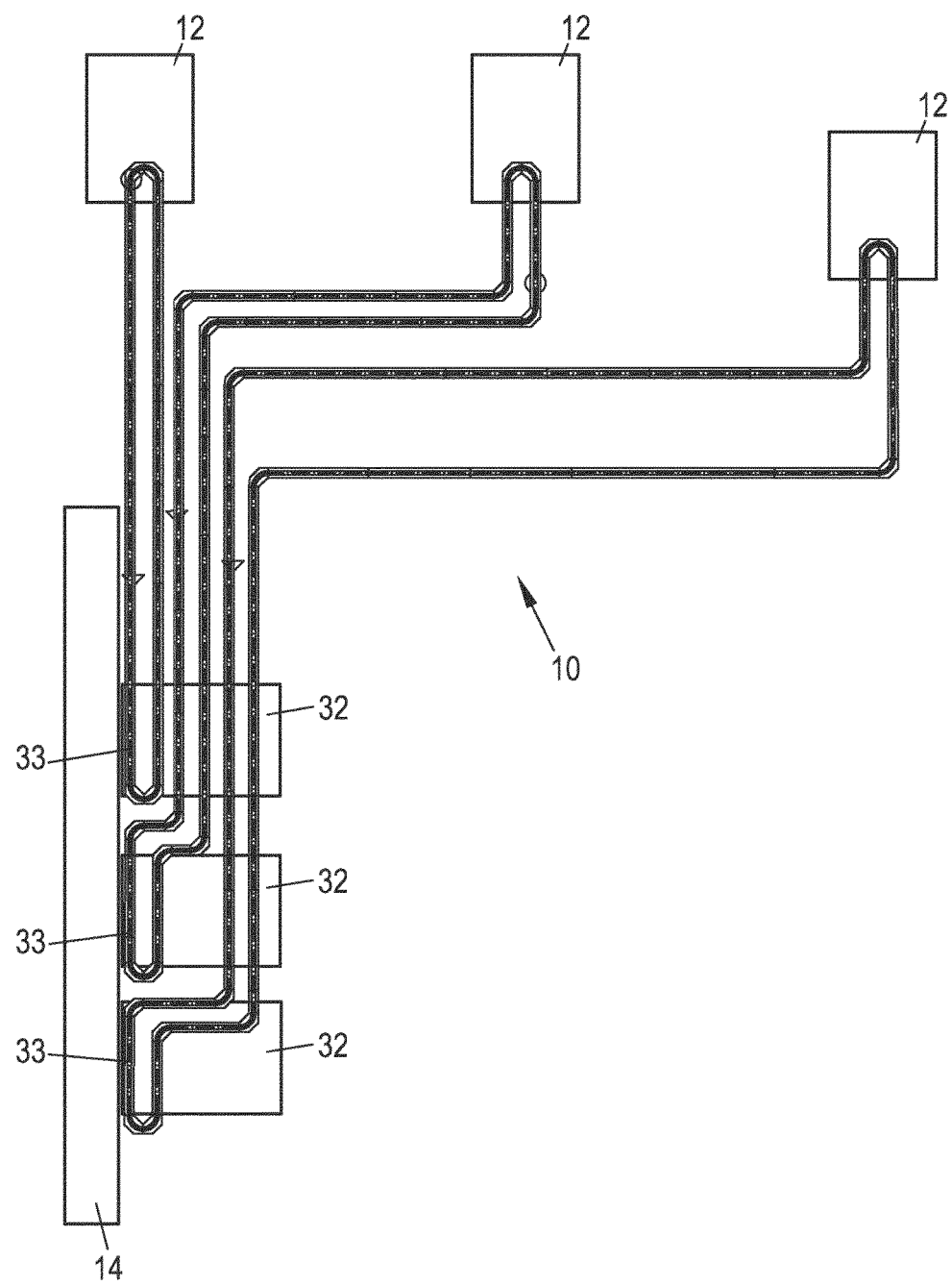

An embodiment is shown in FIG. 12 in which every slicing apparatus 12 has a separate, individually associated path section, with the path sections not being connected to one another. A slicing apparatus 12 is in this respect only connected to a single robot device 32. A further slicing apparatus 12 is in contrast connected to two robot devices 32, while a further slicing apparatus 12 is connected to all the robot devices. The path sections are each rotated by 180° and again run through the respective robot devices 32 on the return route.

Figure 13:
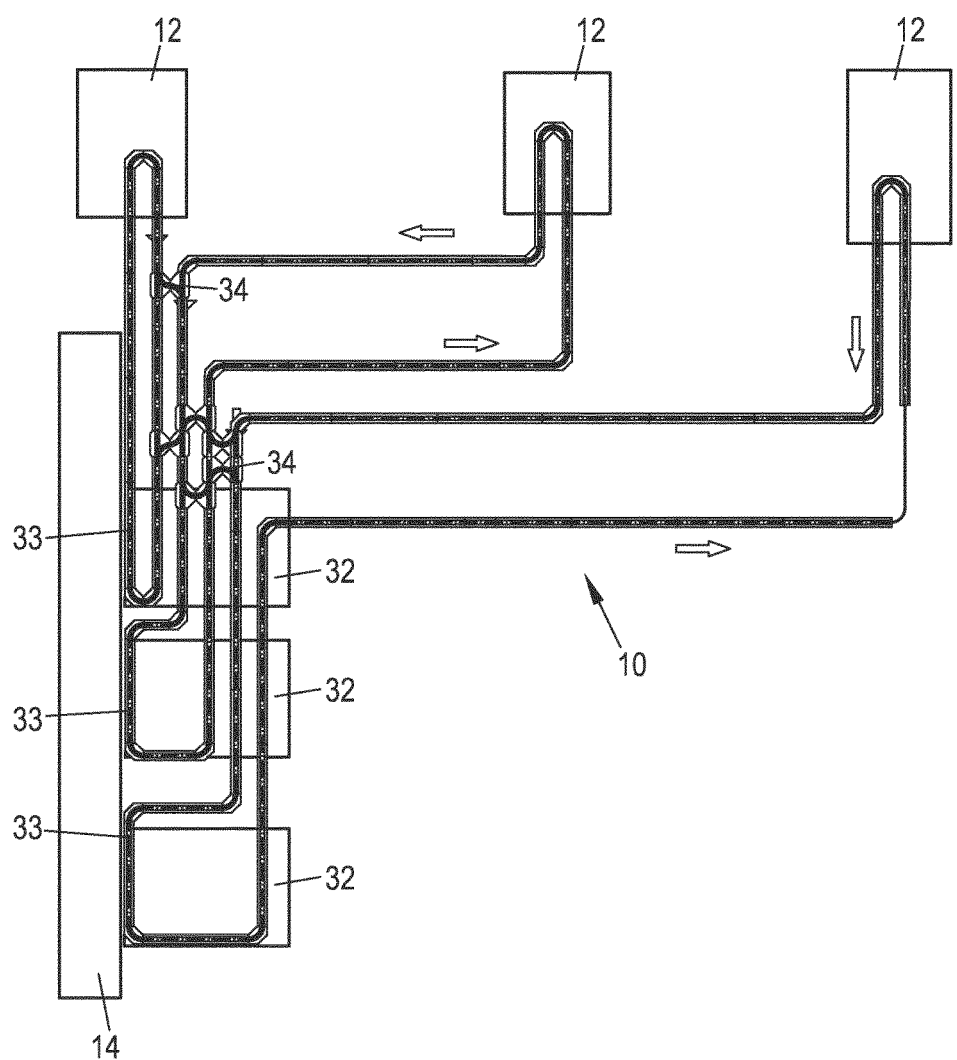

The embodiment in accordance with FIG. 13 substantially corresponds to the embodiment in accordance with FIG. 12. However, the individual path sections are connected to one another via points 34 such that the transport movers can also change as desired between the path sections or in the association with the system components.

Figure 14:
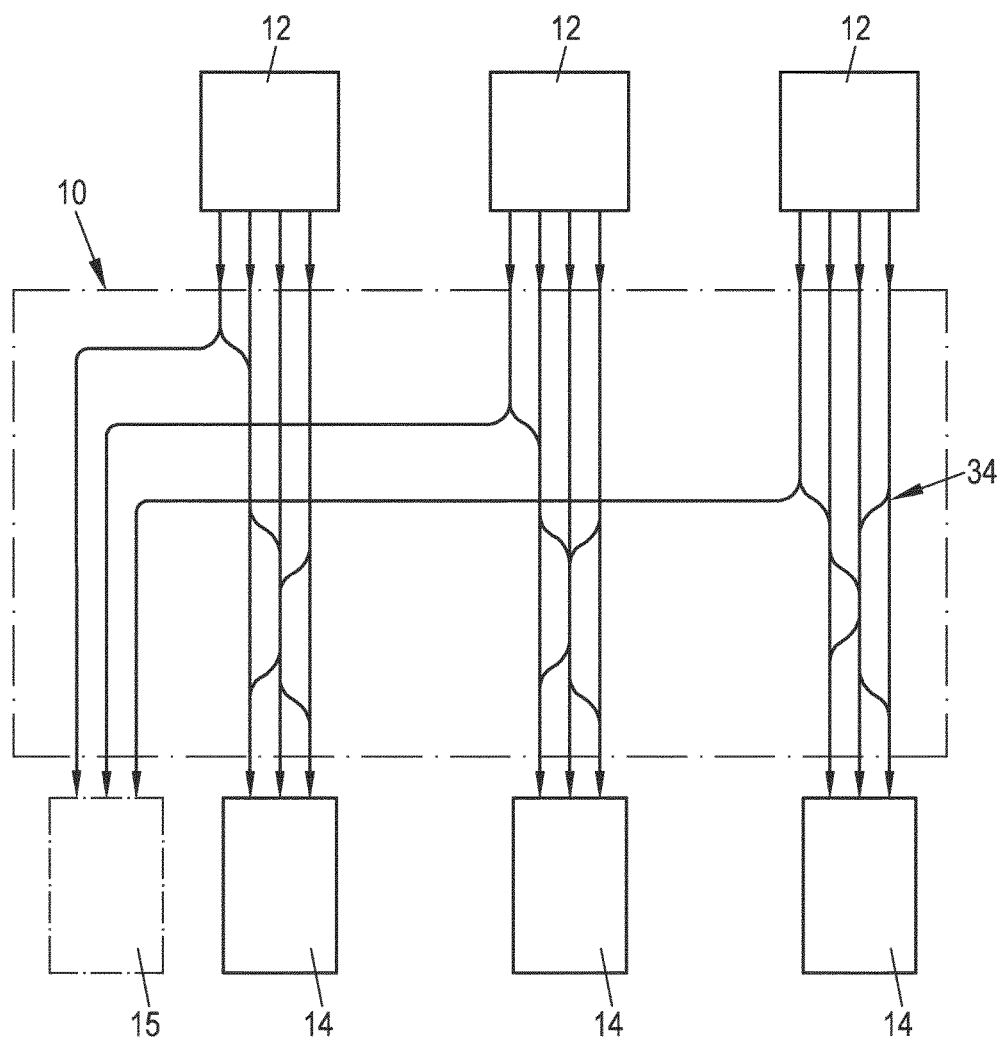

A further embodiment is shown in FIG. 14 in which three slicing apparatus 12 are provided. The multi-track slicing and the thereby resulting multi-track portion conveying are shown schematically. Part portions that can originate from all the slicing apparatus 12 can be branched off to the packaging apparatus 14 shown at the outside left. Mixing portions can be packaged there in this manner. However, in the main conveying stream, each slicing apparatus 12 supplies a separate packaging apparatus 14 with respectively the same product sort. Alternatively or additionally, a tray packaging apparatus 15 can also be provided.

The branching off for a generation of mixed portions can take place permanently or only temporarily.

Figure 15:
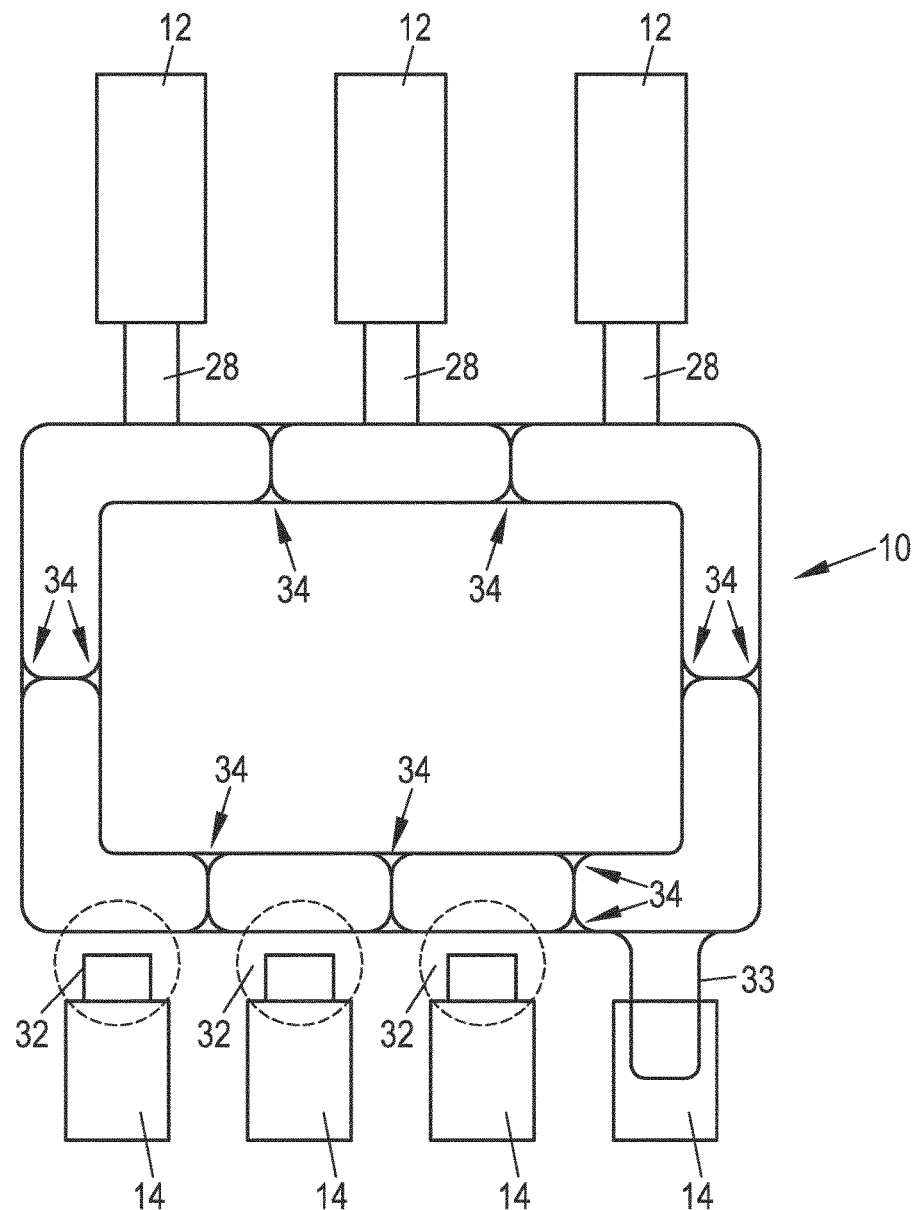

In accordance with the embodiment in FIG. 15, the path system 10 is configured as a two-track system or as a multi-track system. The transport movers can change as desired between an inner path and an outer path via points 34. The portions can in particular be buffered. Furthermore slicing apparatus 12 or packaging apparatus 14 can be bypassed as desired. A mutual overtaking of the transport movers is also possible, just as is a change of direction, e.g. in dependence on the current operating state. The portions can be transferred to the packaging apparatus 14 with the aid of robot devices 32. It is, however, also possible that a path section is, as in the packaging apparatus 14 shown at the right, led closely past the packaging apparatus 14. The portions can in this respect be directly transferred, for example combed off, from the transport mover to the packaging apparatus 14. The transport movers can also e.g. have movable conveyor belts via which the portions can be conveyed directly into the packaging apparatus 14.

Figure 16:
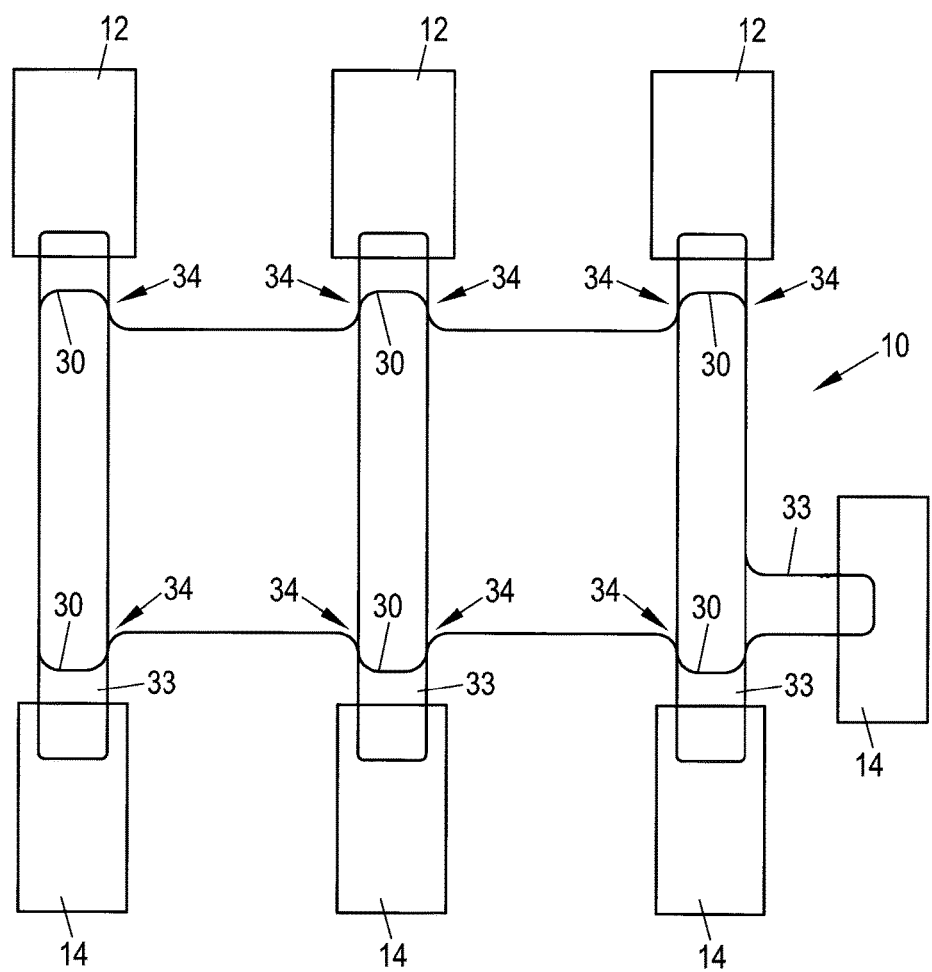

A further possible embodiment of a path system 10 is shown in FIG. 16. Four packaging apparatus 14 are also provided here. Mono-sorts can, for example, be generated and packaged in the lower packaging apparatus 14, while multi-sorts can in particular be generated and packaged in the packaging apparatus 14 shown at the outside right.

The path or magnetic conveyor system 10 can serve in all the cases as a connection component for portion handling between at least one slicing apparatus and at least one packaging apparatus. The path system 10 can in this respect in particular comprise a buffer 20 or can only be partly configured as a buffer 20. In this respect, an access to the buffer content can take place or portions can also be assigned to a packaging apparatus 14, 15 from the buffer 20 as required.

In accordance with the invention, an extremely flexible system is thus provided in which portions can be grouped and buffered in a simple manner. A continuous packaging of both mono-sort portions and multi-sort portions is in particular always possible. Part portions and slices can be generated simultaneously or consecutively.

REFERENCE NUMERAL LIST 10 path system
12 slicing apparatus
14 deep draw packaging apparatus
15 tray packaging apparatus
16 distribution points
48 functional track
20 buffer
22 multi-sort former
24 mixed portion
26 connection points
27 return transport line
28 feed
30 bridge, passing line
32 robot device
33 unloading path
34 points

The invention claimed is:
1. A system comprising
at least one slicing apparatus for slicing food products;
a conveying apparatus for moving portions that each comprise at least one slice cut off from a food product; and
at least one packaging apparatus for packaging the portions,
wherein the conveying apparatus comprises
a plurality of individually movable transport movers for the transport of portions;
a path system for the transport movers in which the transport movers are movable in a direction of transport along at least one predefined path; and
a control device for controlling the movements of the transport movers in the path system;
wherein the transport movers each comprise at least one rotor cooperating with the path system and at least one carrier for portions attached to the rotor; and
wherein the conveying apparatus is configured for moving the portions from the slicing apparatus to the packaging apparatus, wherein a plurality of slicing apparatus and exactly one packaging apparatus are provided, the plurality of slicing apparatus each comprising a dedicated track, the dedicated track in communication with a common track, each common track terminating at a shared endpoint for the plurality of packaging apparatus, and wherein the number of portions that can be generated or packaged per unit of time is greater with the slicing apparatus than the packaging apparatus.

2. The system in accordance with claim 1, wherein exactly one slicing apparatus and a plurality of packaging apparatus are provided.

3. The system in accordance with claim 1, wherein at least two packaging apparatus differ from one another, such that one packaging apparatus generates a different number of portions or packages per unit than another packaging apparatus.

4. The system in accordance with claim 1, wherein the path system comprises a buffer configured for receiving at least one transport mover for each packaging apparatus.

5. The system in accordance with claim 1, wherein the path system comprises a buffer configured for receiving at least one transport mover for at least one packaging apparatus and does not comprise a buffer for at least one packaging apparatus.

6. The system in accordance with claim 1, wherein the control device controls the transport movers such that uniform portions are packaged by at least one packaging apparatus and mixed portions of a combination of part portions are packaged using at least one packaging apparatus.

7. The system in accordance with claim 1, wherein at least one transport mover having a part portion is branched off from a path section that leads to a first packaging device.

8. The system in accordance with claim 6, wherein the combination of part portions comprises a plurality of part portions, wherein all the part portions respectively originate from a buffer.

9. The system in accordance with claim 6,

Wherein the combination of part portions comprises a plurality of part portions, wherein at least a first part portion originates from a buffer; and wherein at least a second part portion does not originate from a buffer.

10. The system in accordance with claim 1, wherein the control device controls the transport movers such that, in dependence on a criterion, they are not moved directly to a slicing apparatus at least temporarily and/or are moved to a packaging.

11. The system in accordance with claim 1, wherein the control device controls the transport movers such that, in dependence on a criterion, they are not moved directly to a slicing apparatus at least temporarily.

12. The system in accordance with claim 1, wherein exactly one slicing apparatus and exactly one packaging apparatus are provided.

13. The system in accordance with claim 12, wherein the path comprises at least one set of distribution points that splits at least one track coming from the slicing apparatus into a plurality of functional tracks.

14. The system in accordance with claim 1, wherein the path system comprises at least one set of connection points that combines a plurality of functional tracks to at least one track leading to the packaging apparatus.

15. The system in accordance with claim 13, wherein each functional track comprises a buffer configured for receiving at least one transport mover or is configured as a buffer.

16. The system in accordance with claim 13, wherein at least one functional track comprises a buffer configured for receiving at least one transport mover or is configured as a buffer, with at least one functional track not comprising a buffer and not being configured as a buffer.

17. The system in accordance with claim 13, wherein a plurality of functional tracks are configured for the transport, for the processing, for the combining and/or for the buffering of portions or part portions of different sorts.

18. The system in accordance with claim 1, wherein the path system comprises at least one passing line that bridges a path section that leads to at least one of a slicing apparatus and a packaging apparatus.

19. The system in accordance with claim 1, wherein the path system comprises at least one return transport line that branches of from a path section that leads from a slicing apparatus to a packaging apparatus; and opens into the path section again upstream.

20. The system in accordance with claim 19, wherein the return transport line is configured to supply a transport mover to the slicing apparatus again; to channel a transport mover for the part covering of the path system onto the path section; and/or to channel a transport mover having slicing residues or faulty portions out of the path section.

21. The system in accordance with claim 1, wherein a robot device is provided for transferring portions from the conveying apparatus to the packaging apparatus.

22. The system in accordance with claim 1, wherein the path system has at least one unloading track that leads through an unloading region in which at least one packaging apparatus is arranged.

23. The system in accordance with claim 22, wherein the unloading track extends at least section-wise in parallel with a transfer region of a packaging apparatus.

24. The system in accordance with claim 22, wherein the unloading track leads through the unloading region a multiple of times.

25. The system in accordance with claim 22, wherein the unloading track comprises a plurality of unloading tracks, the plurality of unloading tracks leading through all the transfer regions of the packaging apparatus.

26. The system in accordance with claim 22, wherein, the unloading track comprises a plurality of unloading tracks wherein at least one unloading track leads through a plurality of transfer regions of the packaging apparatus and at least one unloading track does not lead through at least one transfer region of a packaging apparatus.

* * * * *